United States Patent [19]
Tzelnic et al.

[11] Patent Number: 5,829,046
[45] Date of Patent: Oct. 27, 1998

[54] ON-LINE TAPE BACKUP USING AN INTEGRATED CACHED DISK ARRAY

[75] Inventors: Percy Tzelnic, Concord; Scott R. Dunham, Billerica, both of Mass.

[73] Assignee: EMC Corporation, Hopkinton, Mass.

[21] Appl. No.: 661,187

[22] Filed: Jun. 10, 1996

Related U.S. Application Data

[60] Provisional application No. 60/005,988 Oct. 27, 1995.
[51] Int. Cl.[6] ................................................. G06F 12/14
[52] U.S. Cl. ........................ 711/162; 711/161; 711/156; 711/118; 711/111; 711/113; 711/100
[58] Field of Search ..................... 395/200.09, 200.13; 348/8, 7; 364/514 R, 514; 711/162, 161

[56] References Cited

U.S. PATENT DOCUMENTS

| | | | |
|---|---|---|---|
| 5,208,665 | 5/1993 | McCalley et al. | 358/862 |
| 5,218,695 | 6/1993 | Noveck et al. | 395/600 |
| 5,276,860 | 1/1994 | Fortier et al. | 395/575 |
| 5,276,867 | 1/1994 | Kenley et al. | 395/600 |
| 5,367,698 | 11/1994 | Webber et al. | 395/800 |
| 5,371,532 | 12/1994 | Gelman et al. | 348/7 |
| 5,442,749 | 8/1995 | Northcutt et al. | 395/200.09 |
| 5,442,771 | 8/1995 | Filepp et al. | 395/200.08 |
| 5,504,873 | 4/1996 | Martin et al. | 395/438 |
| 5,519,435 | 5/1996 | Anderson | 348/8 |
| 5,528,513 | 6/1996 | Vaitzblit et al. | 364/514 A |
| 5,550,982 | 8/1996 | Long et al. | 395/200.13 |
| 5,551,025 | 8/1996 | O'Reilley et al. | 396/600 |
| 5,574,662 | 11/1996 | Windrem et al. | 364/514 R |
| 5,586,264 | 12/1996 | Bleknap et al. | 395/200.08 |
| 5,590,320 | 12/1996 | Maxey | 395/619 |
| 5,594,910 | 1/1997 | Filepp et al. | 395/800 |
| 5,603,058 | 2/1997 | Belknap et al. | 395/855 |
| 5,606,359 | 2/1997 | Youden et al. | 348/7 |
| 5,625,405 | 4/1997 | DuLac et al. | 348/7 |
| 5,633,810 | 5/1997 | Mandal et al. | 364/514 |
| 5,633,999 | 5/1997 | Clowes et al. | 395/182.04 |

FOREIGN PATENT DOCUMENTS

| | | | |
|---|---|---|---|
| 633694 | 1/1995 | European Pat. Off. | H04N 7/173 |
| WO93/16557 | 8/1993 | WIPO | H04N 7/173 |
| WO95/10918 | 4/1995 | WIPO | H04N 7/14 |

OTHER PUBLICATIONS

Rangen PV, Vin HM, "Designing file systems for digital audio and video," Proceedings of the 13th ACM Symposium on Operating Systems Principles, Monterey, Calif., 1991, pp. 81–94.

(List continued on next page.)

Primary Examiner—Tod R. Swann
Assistant Examiner—Fred F. Tzeng
Attorney, Agent, or Firm—Arnold, White & Durkee

[57] ABSTRACT

A video file server includes an integrated cached disk array storage subsystem and a plurality of stream server computers linking the cached disk array to a data network for the transfer of video data streams. The video file server further includes a controller server for applying an admission control policy to client requests and assigning stream servers to service the client requests. The stream servers include a real-time scheduler for scheduling isochronous tasks, and supports at least one industry standard network file access protocol and one file access protocol for continuous media file access. The cached disk storage subsystem is responsive to video prefetch commands, and the data specified for a prefetch command for a process are retained in an allocated portion of the cache memory from the time that the cached disk storage subsystem has responded to the prefetch command to the time that the cached disk storage subsystem responds to a fetch command specifying the data for the process. The time between prefetching and fetching is selected based on available disk and cache resources. The video file server provides video-on-demand service by maintaining and dynamically allocating sliding windows of video data in the random access memories of the stream server computers. The video file server has a tape silo for providing network backup services, and data to be written to tape are prestaged in the cached disk storage subsystem.

34 Claims, 17 Drawing Sheets

OTHER PUBLICATIONS

Vin HM, Rangan PV, (1993), "Designing a multiuser HDTV storage service," IEEE Journal on Selected Areas in Communication, vol. 11, No. 1, Jan. 1993, pp. 153–164.

Anderson DP, Osawa Y, Govindan R, "A file system for continuous media," ACM Transactions on Computer Systems, vol. 10., No. 4, Nov. 1992, pp. 311–337.

Federighi C, "A Distributed Hierarchical Storage Manager for a Video–on–Demand System," Department of Electrical Engr. and Computer Science, University of California, Berkeley, California, Dec. 1993.

Hastings R, The shark continuous–media file server. Proceedings IEEE COMPCON 93, San Francisco, Calif., 1993, pp. 12–15.

Little TD, Rhanger G, Folz RJ, Gibbon JF, Reeve FW, Schelleng DH, Venkatesh D, "A digital on–demand video service supporting content based queries," Proceedings of ACM Multimedia 93, Anaheim, Calif., Aug. 1–6, 1993, pp. 427–436.

Lougher, P, Sheperd, D. "The design of a storage server for continuous media," The Computer Journal, vol. 36, No. 1, 1993, pp. 32–42.

Rangan PV, Vin HM, Ramanathan S, "Designing an on–demand multimedia service," IEEE Communications Magazine, vol. 30, No. 7, Jul. 1992, pp. 56–64.

Sincoskie, WD, "System architecture for a large scale video on demand service," Computer Networks and ISDN Systems, vol. 22, No. 2, Sep. 1991, pp. 155–162.

Tobagi FA, Pang J, "StarWorks (Trademark)—A video applications server," Proceedings, IEEE COMPCON 93, San Francisco, Calif., 1993, pp. 4–11.

Vaitzblit L, "The design and implementation of a high bandwidth file service for continuous media," Master's Thesis, Massachusetts Institute of Technology, Cambridge, Mass., Nov. 4, 1991.

ON-LINE TAPE BACKUP USING AN INTEGRATED CACHED DISK ARRAY

RELATED APPLICATIONS

The present application is a divisional of provisional application Ser. No. 60/005,988 filed Oct. 27, 1995 by Percy Tzelnic et al., entitled "Video File Server," fully incorporated herein by reference. The detailed description in the present application has been updated to conform to the applicants' present implementation of their invention.

The present application also contains a disclosure which is common with the following other divisional applications of Ser. No. 60/005,988: Percy Tzelnic et al., Ser. No. 08/661,152 filed Jun. 10, 1996, entitled "video file server using an integrated cached disk array and stream server computers;" Natan Vishlitzky et al., Ser. No. 08/661,185 filed Jun. 10, 1996 entitled "Prefetching to Service Multiple Video Streams from an Integrated Cached Disk Array"; and Uresh Vahalia et al., Ser. No. 08/661,053 filed Jun. 10, 1996, entitled "Staggered Stream Support for Video On Demand".

BACKGROUND OF THE INVENTION

1. Field of the Invention

The present invention relates generally to data storage subsystems, and more particularly to cached disk arrays. The invention specifically relates to network file servers.

2. Background Art

Mainframe data processing, and more recently distributed computing, have required increasing large amounts of data storage. This data storage is most economically provided by arrays of low-cost disk drives integrated with a large semiconductor cache memory. More recently, however, rapid advances in processor, high-speed network and switching technologies have enabled various multi-media applications having storage requirements that exceed the capabilities of conventional integrated cached disk arrays. Multi-media material is typically composed of a large amount of audio, video, graphics, text, and data, requiring a large storage capacity. More importantly, limitations on the amount of buffer capacity of user terminals may set stringent demands on the required availability of data access.

Real-time video, such as "video on demand" or interactive television, are particularly demanding multi-media applications. Real-time video is "isochronous"; i.e., it must be delivered at a constant data rate. Interactive video has the additional requirement that data access must appear nearly instantaneous to the user.

Storage systems under development for interactive television are known as "video servers." It is desired for a video server to provide real-time video at a fixed data rate to a large number of concurrent users, to store a large number of movie titles on-line with a larger number of titles off-line in tape archives, and to respond in less than a second to a user's request for a movie catalog search or a movie order.

Current video server architectures are described in Krishan Natarajan, "Video Servers Take Root," *IEEE Spectrum,* April 1995, pp. 66–69. Video server architectures generally include disk and dynamic RAM, memory controllers, output data bases, and output interfaces. The video server is designed to ensure that video data are delivered at a constant rate. Encoded audio and video data from disk or RAM are combined into single isochronous streams. A number of such streams are switched to appropriate output interfaces and transmitted to the users. The video server also provides a transaction-processing system for user-initiated functions.

Current designs for video servers are based on PC (personal computer) technology, multiprocessing Unix computers, massively parallel computer architectures, or specialized hardware for real-time video delivery.

PC-based video servers use specialized software running on one machine or on networks of them. On multiple PCs, specialized software for the transaction processing and real-time video and audio delivery functions can be split among different platforms.

Video servers based on multiprocessor minicomputers also use specialized software running on standard computer hardware, but can typically cope with larger number of concurrent streams than PCs. As with multiple-PC platforms, the real-time delivery function can be separated from the transaction-processing function.

A massively parallel computer architecture interconnects hundreds of processors, each with its own random-access memory and disk storage. Compressed audio and video data are distributed across the disk storage processors. Control software reads the compressed data and formats the data into output video streams.

A video server based on specialized hardware delivers compressed video and audio directly from disk storage. The hardware is designed to pull the video data out of the disk storage and transmit the data downstream at the required data rate.

A video file server also needs a scheduler and an admission-control policy to maintain performance guarantees for real-time streams in the presence of unpredictably varying non-real-time traffic while ensuring system stability during overloads. A suitable scheduler and admission control policy is described in K. K. Ramakrishnan et al., "Operating System Support for a Video-On-Demand File Service," *Multimedia Systems,* Vol. 3, Springer-Verlag, 1995, pp. 53–65. The scheduler supports multiple classes of tasks with diverse performance requirements and allows for the co-existence of guaranteed real-time requests with sporadic and unsolicited requests.

SUMMARY OF THE INVENTION

A file server in accordance with the invention provides save and restore backup services to clients in a data network. The file server includes a cached disk storage subsystem, a tape silo linked to the cached disk storage subsystem for the transfer of data from the ICDA to the tape silo, and a plurality of stream server computers linking the cached disk storage subsystem and tape silo to the data network for transfer of data between the cached disk storage subsystem and the data network and between the tape silo and the data network. The video file server further includes a controller servo for receiving a save or restore backup service request from a client in the data network, for performing volume management and scheduling for the backup service request, and for selecting one of the stream server computers to receive backup data from the client in response to a save backup service request or to transmit the backup data to the client in response to a restore backup service request. In response to a save backup service request, the selected stream server prestages the backup data from the client into the cached disk storage subsystem before the backup data are staged into the tape silo.

In a preferred embodiment, each stream server computer has a first fast, wide differential (FWD) SCSI link to a the cached disk storage subsystem and a second separate FWD SCSI link to a respective read/write station in the tape silo. The controller servers includes dual, redundant computers which are linked by a local data link to each of the stream server computers. The controller servers also have FWD SCSI links to the cached disk storage subsystem as well as to the tape silo. The cached disk storage subsystem 23 uses a nonvolatile write buffer and well-known RAID techniques of error correction to recover from disk drive failures. The cached disk storage subsystem acknowledges completion of a save backup operation as soon as the data are written to the cached disk storage subsystem, and the cached disk storage subsystem provides data requested by a restore backup service request when the data requested are in the ICDA.

BRIEF DESCRIPTION OF THE DRAWINGS

Other objects and advantages of the invention will become apparent upon reading the following detailed description with reference to the accompanying drawings wherein.

Figure 1:
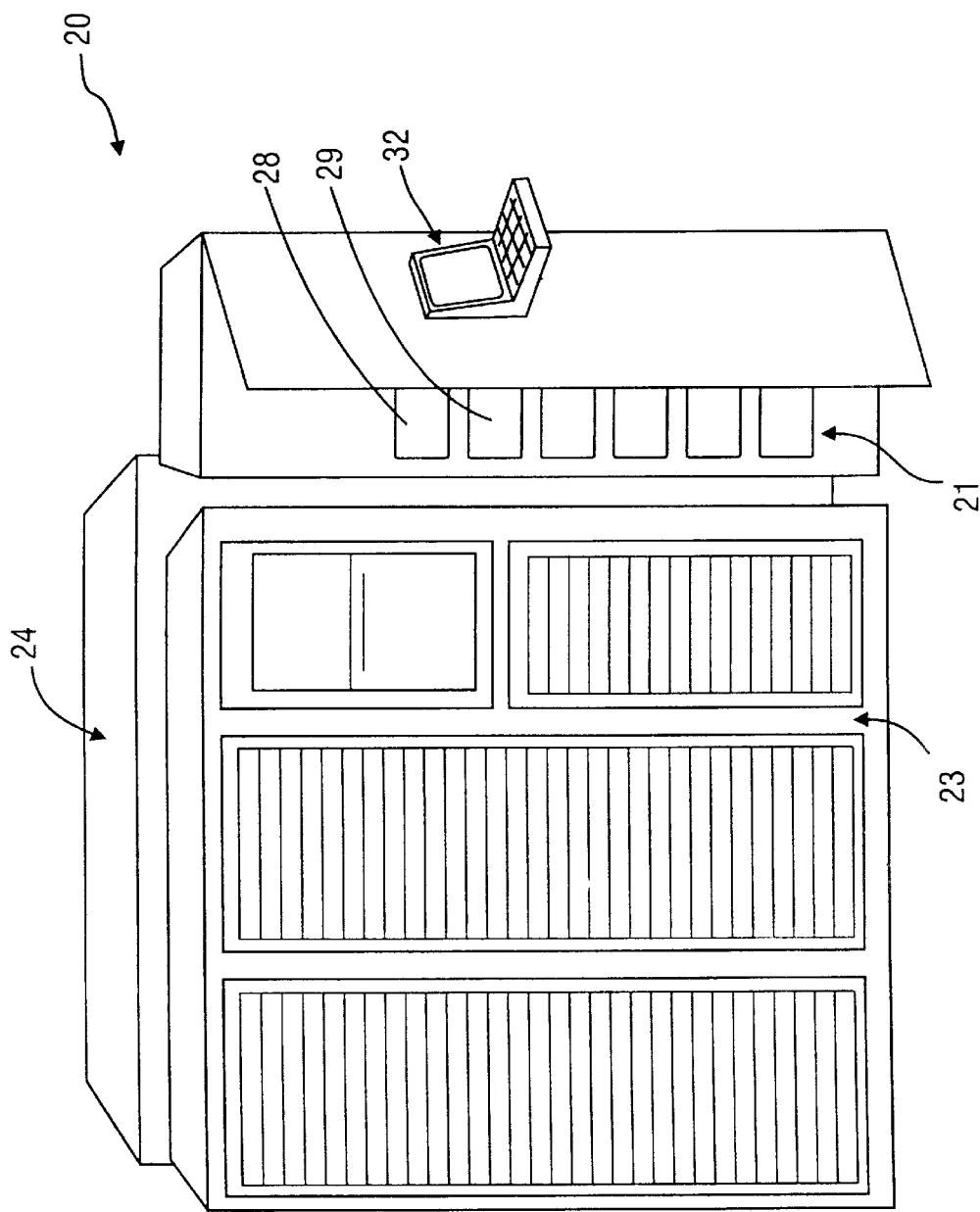
FIG. 1 is a perspective view of a video file server that incorporates the present invention.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

I. The Architecture of the Video File Server

Turning now to FIG. 1 of the drawings, there is shown a video file server generally designated 20 incorporating the present invention. The video file server 20 includes an array of stream servers 21, at least one control server 28, 29, an integrated cached disk array storage subsystem 23, and a tape silo 24. The video file server 20 is a high performance, high capacity, and high-availability network-attached data server. It provides the ability for multiple file systems to exist concurrently over multiple communication stacks, with shared data access. It also allows multiple physical file systems to co-exist, each optimized to the needs of a particular data service.

The video file server 20 is managed as a dedicated network appliance, integrated with popular network operating systems in a way, which, other than its superior performance, is transparent to the end user. It provides specialized support for isochronous data streams used in live, as well as store-and forward, audio-visual applications. Therefore, the video file server 20 is suitable for a wide variety of applications such as image repositories, video on demand, and networked video applications, in addition to high-end file server applications such as the Network File System (NFS, version 2 and version 3) (and/or other access protocols), network or on-line backup, fast download, etc. NFS is a well-known IETF file access protocol standard (RFC 1094, Sun Microsystems, Inc., "NFS: Network File System Protocol Specification," Mar. 1, 1989). NFS acts as a network server for network communications by providing basic file access operations for network clients. Such basic file access operations include opening a file, reading a file, writing to a file, and closing a file.

The clustering of the stream servers 21 as a front end to the integrated cached disk array 23 provides parallelism and scalability. The clustering of random-access memory in the stream servers 21 provides a large capacity cache memory for video applications.

Each of the stream servers 21 is a high-end commodity computer, providing the highest performance appropriate for a stream server at the lowest cost. The stream servers 21 are mounted in a standard 19" wide rack. Each of the stream servers 21, for example, includes an Intel processor connected to a EISA or PCI bus and at least 64 MB of random-access memory. The number of the stream servers 21, their processor class (i486, Pentium, etc.) and the amount of random-access memory in each of the stream servers, are selected for desired performance and capacity characteristics, such as the number of concurrent users to be serviced, the number of independent multi-media programs to be accessed concurrently, and the desired latency of access to the multi-media programs, as will be further described below.

Each of the stream servers 21 contains one or more high-performance FWD (fast, wide, differential) SCSI connections to the back-end storage array. Each of the stream servers 21 may also contain one or more SCSI connections to the tape silo 24. Each of the stream servers 21 also contains one or more outbound network attachments configured on the stream server's EISA or PCI bus. The outbound network attachments, for example, are Ethernet, FDDI, ATM, DS1, DS3, or channelized T3 attachments to data links to a network (25 in FIG. 2). Each of the stream servers 21 also includes an additional Ethernet connection to an internal Ethernet link (26 in FIG. 2) for coordination of the stream servers with each other and with one or more controller servers 28, 29.

Figure 2:
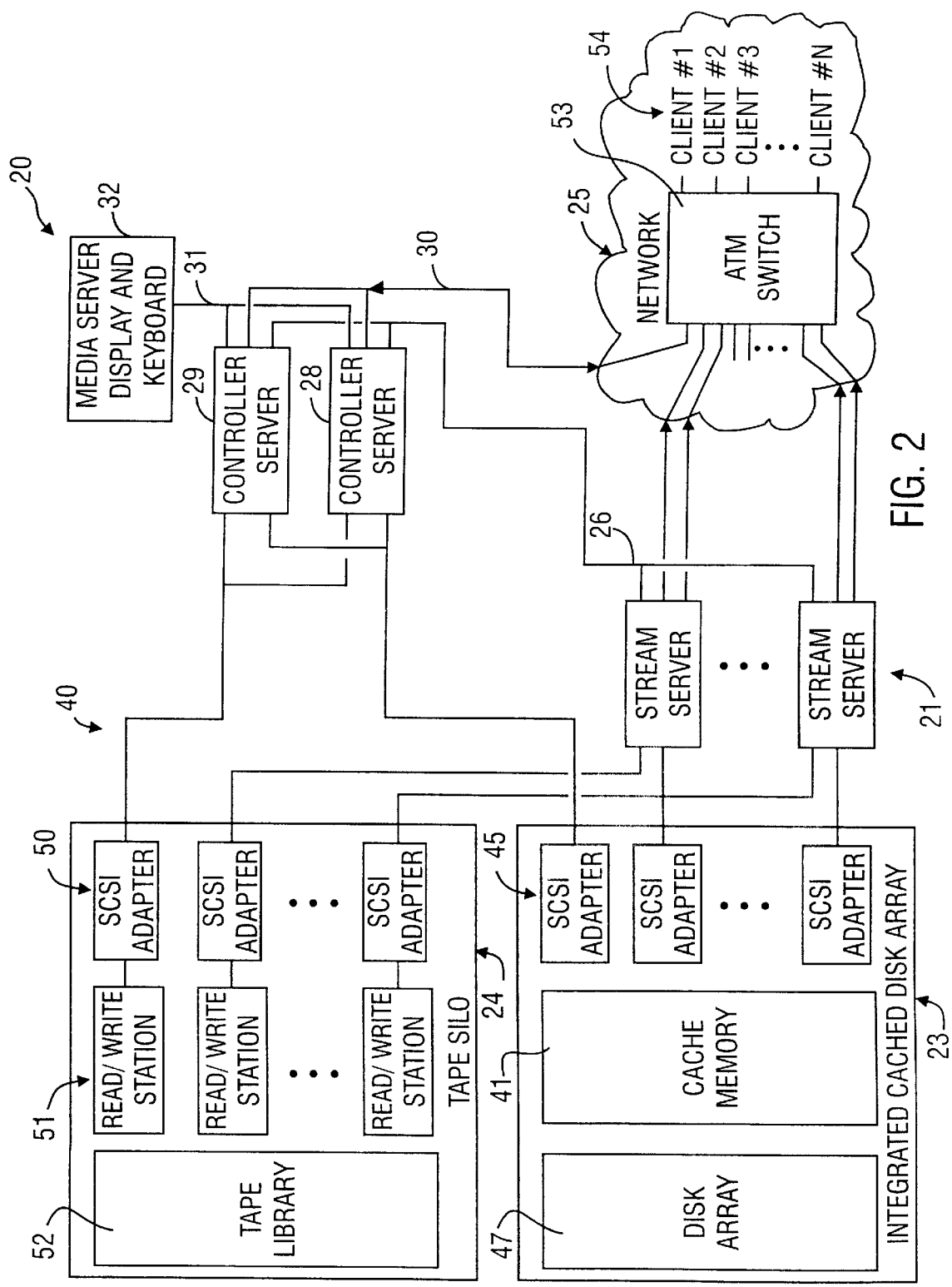
FIG. 2 is a block diagram of the video file server of FIG. 1 and its connections to a network.

The controller servers 28, 29 shown in FIG. 2 are dual redundant computers 28, 29, each of which is similar to each of the stream servers 21. Each of the dual redundant controller servers 28, 29 has a network attachment to a bidirectional link (30 in FIG. 2) in the network (25 in FIG. 2), through which each of the controller servers 28, 29 can conduct service protocols. The service protocols include one or more standard management and control protocols such as SNMP (RFC 1157, M. Schoffstall, M. Fedor, J. Davin, J. Case, "A Simple Network Management Protocol (SNMP)," May 10, 1990), and at least one Continuous Media File Access Protocol supporting isochronous real-time multimedia data transmission from the stream servers 21 to the network (25 in FIG. 2).

Each of the dual redundant controller servers 28, 29 has an Ethernet connection to the local Ethernet link 26. Each of the controller servers 28, 29 also has a connection to a serial link 31 to a media server display and keyboard 32. The controller servers 28, 29 run a conventional operating system (such as Windows NT or UNIX) to provide a hot-failover redundant configuration. An active one of the dual redundant controller servers 28, 29 functions as a media server controller for the video file server 20. The active one of the controller servers 28, 29 also allows management and control of the server resources from the network using standard protocols, such as the Simple Network Management Protocol (SNMP). SNMP is an internet protocol that permits inspection and modification of system variables such as the network address (IP) and the number of buffers for network communication. The active one of the controller servers 28, 29 may also provide lock management if lock management is not provided by the integrated cached disk array 23.

For multi-media data transfer, the active one of the controller servers 28, 29 assigns one of the stream servers 21 to the network client 54 requesting multi-media service. The network 25, for example, has conventional switching mechanisms, such as an ATM switch 53 or arrays of cross-bar switches, that permit any one of the clients 54 to communicate with any one of the stream servers 21. The active one of the controller servers 28, 29 could assign a stream server to a network client by a protocol sending to the client the network address of the stream server assigned to send or receive data to or from the client. Alternatively, the active one of the controller servers 28, 29 could communicate with a switching mechanism such as the ATM switch 53 to establish a data link between the client and the stream server assigned to the client.

The integrated cached disk array 23 is configured for an open systems network environment. Preferably the integrated cached disk array 23 is a Symmetrix 5500 (Trademark) ICDA "(Trademerk)" manufactured by EMC Corporation, 171 South Street, Hopkinton, Mass., 01748-9103.

Turning now to FIG. 2, there is shown a block diagram of the video file server 20 including the SCSI connections 40 among the integrated cached disk array 23, the tape silo 24, the controller servers 28, 29, and the stream servers 21. The integrated cached disk array 23 includes a large capacity semiconductor cache memory 41 and SCSI adapters 45 providing one or more FWD SCSI links to each of the stream servers 21 and to each of the dual redundant controller servers 28, 29.

The tape silo 24 includes an array of SCSI adapters 50 and an array of read/write stations 51. Each of the read/write stations 51 is connected via a respective one of the SCSI adapters 50 and a FWD SCSI link to a respective one of the stream servers 21 or each of the redundant controller servers 28, 29. The read/write stations 51 are controlled robotically in response to commands from the active one of the controller servers 28, 29 for tape transport functions, and preferably also for mounting and unmounting of tape cartridges into the read/write stations from storage bins.

In a preferred mode of operation, to archive data from a file from the network to tape, one of the stream servers 21 receives the file from the network 25 and prestages the file to the integrated cached disk array 23 at a high rate limited by the network transmission rate (about 150 GB/hour). Then one of the stream servers 21 destages the file from the integrated cached disk array 23 to an associated one of the read/write stations 51 at a tape device speed (about 7 GB/hour). For most applications, prestaging to disk can be done immediately, and staging from disk to tape including sorting of files onto respective tape cassettes can be done as a background operation or at night, when the load on the video server is at a minimum. In this fashion, the integrated cached disk array 23 can absorb a high data inflow aggregation from tens or hundreds of network links streaming from multiple sites, and balance this load on the read/write stations 51. Prestaging to the integrated cached disk array allows better use of the read/write stations 51, matching of server flow to tape streaming flow, and reduction of tape and read/write station wear. Prestaging to the back-end also allows multiple classes of backup and restore services, including instant backup for files maintained on disk in the integrated cached disk array, and temporary batch backup pending a success or failure acknowledgment. Prestaging to the integrated cached disk array 23 also makes economical an on-line archive service performing the staging from the integrated cached disk array to tape as a background process.

Figure 3:
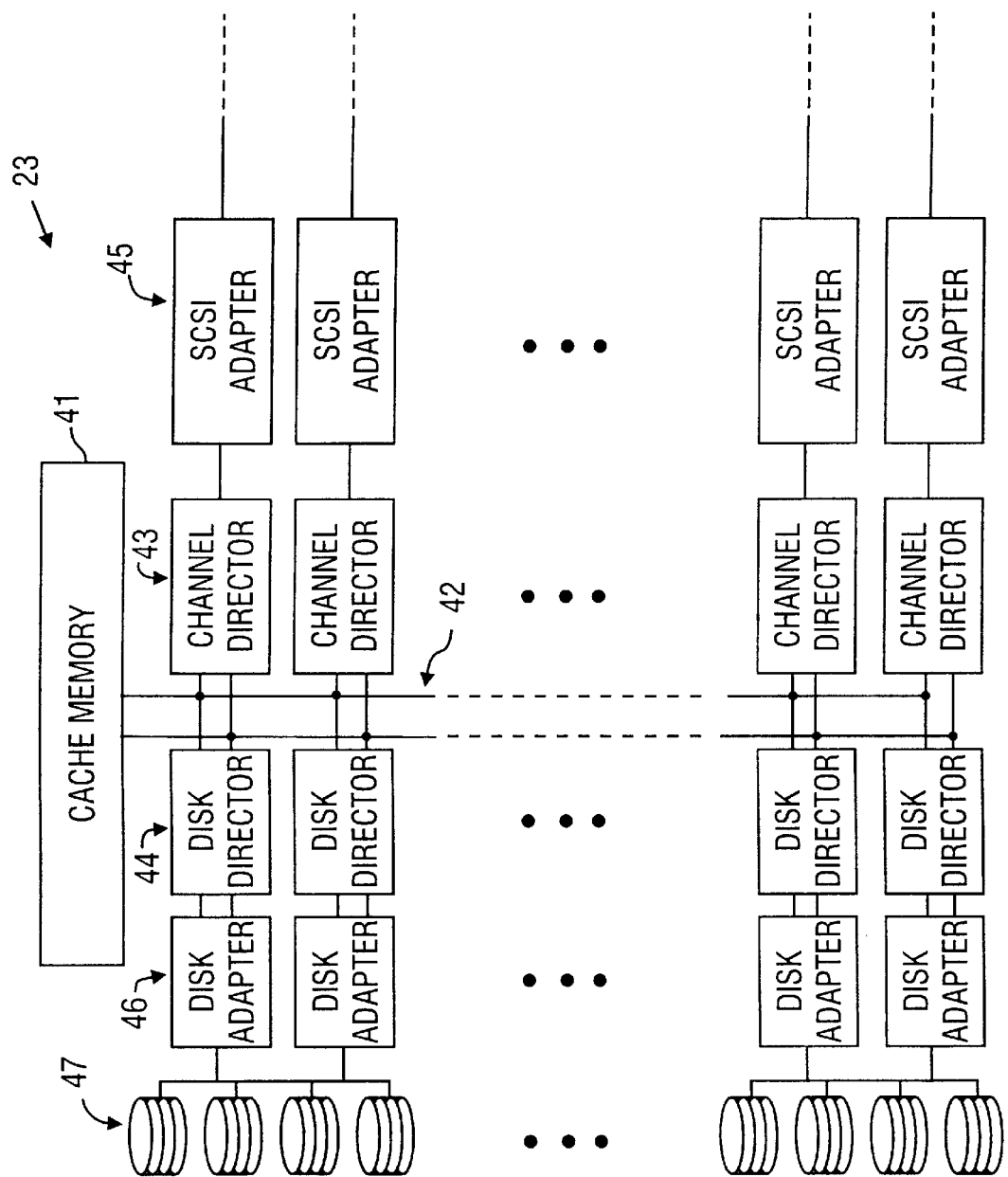
FIG. 3 is a block diagram of an integrated cached disk storage system used in the video file server of FIG. 1.

Turning now to FIG. 3, there is shown a more detailed block diagram of the integrated cached disk array 23. The cache memory 41 is composed of dynamic RAM cards mating with a dual redundant back-plane system bus 42. The integrated cached disk array 23 also includes microprocessor cards that mate with the back-plane system bus 42 and are programmed to function as channel directors 43 or disk directors 44. Each of the channel directors 43 is interfaced through one of a number of SCSI adapters 45 to the SCSI interface of one of the stream servers 21. Each of the disk directors 44 is interfaced through at least one of a number of disk adapters 46 connected to a string of commodity FBA (fixed-block architecture) disk drives 47. The channel directors 43 access data in the cache memory 41 in response to a request from its associated stream server. If data to be read by a channel director are not found in cache memory, one of the disk directors 44 and disk adapters 46 transfers or "stages" the data from the disk array 47 to the cache memory 41. In a background process, the disk directors 44 and disk adapters 46 also write-back data from the cache memory 41 to the disk array 47, after the channel directors write data to the cache memory 41. In addition to providing intermediate storage for the data transferred between the channel directors 43 and the disk directors 44, the cache memory 41 also provides intermediate storage for control information transferred among the channel directors and disk directors.

The bus 42 is preferably the back-plane of a printed-circuit card-cage or main-frame in the integrated cached disk array 23, and each of the channel directors 43 and disk directors 44 is constructed on a printed circuit board that is mounted in the card-cage or main-frame. The channel director and disk director boards are further described in Yanai et al. U.S. Pat. No. 5,335,352, issued Aug. 2, 1994, and entitled Reconfigurable, Multi-Function Disc Controller, incorporated herein by reference. The cache memory 41 is constructed on a number of additional printed circuit boards that are mounted in the card-cage or main-frame. Further details regarding the construction and operation of the integrated cached disk array 23 are disclosed in Yanai et al., U.S. Pat. No. 5,206,939, issued Apr. 27, 1993; and Yanai et al. U.S. Pat. No. 5,381,539, issued Jan. 10, 1995; all incorporated herein by reference.

II. The Video File Server Software

Figure 4:
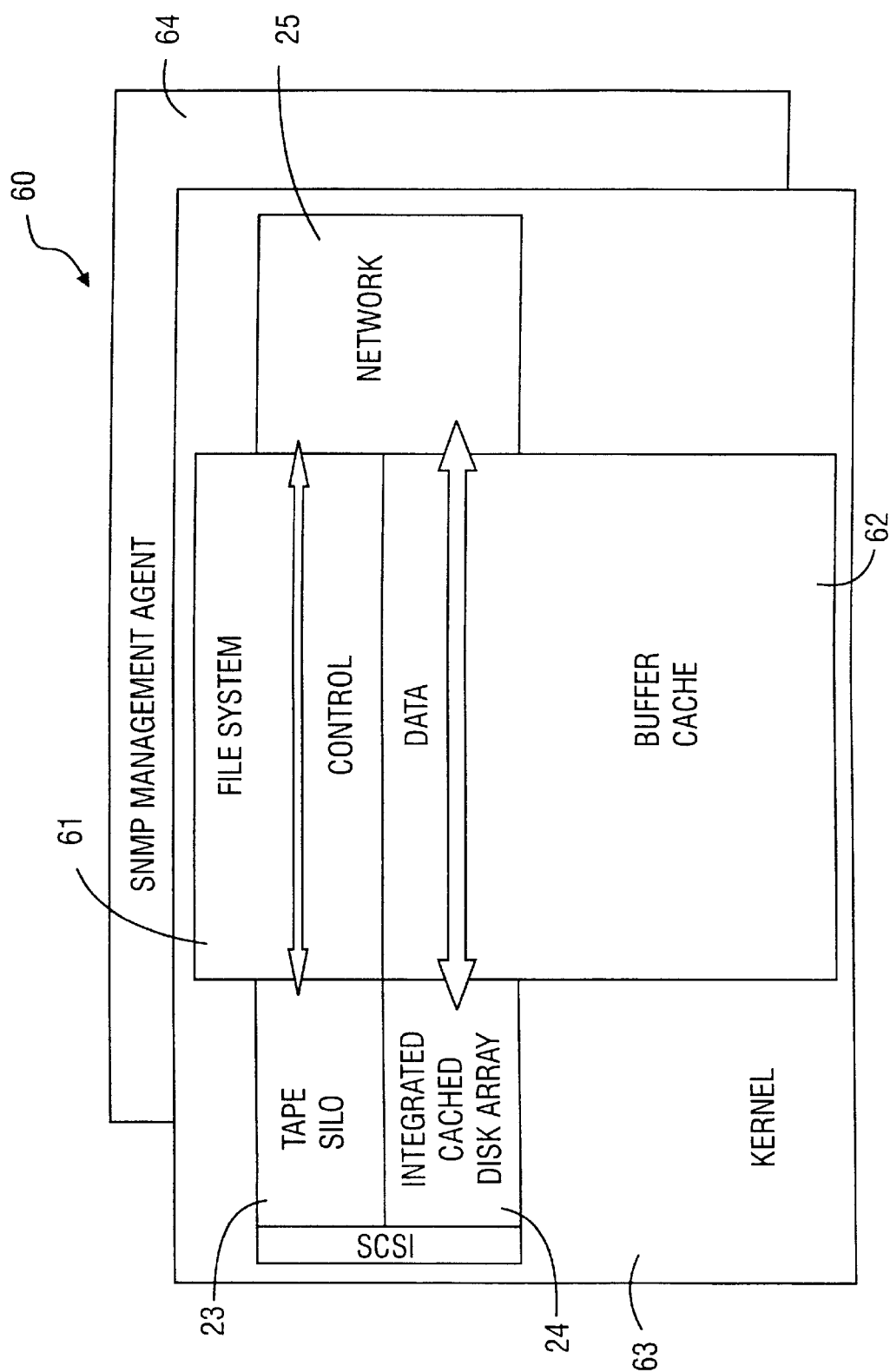
FIG. 4 is a block diagram showing software structure in the video file server of FIG. 1.

Turning now to FIG. 4, there is shown a block diagram of software 60 providing a real-time processing environment in the video file server (20 of FIGS. 1 and 2). The software 60 is executed by the processors of the stream servers 21. The software 60 also provides an environment for managing files services and multiple high-performance data streams as well as a standard set of service-level application program interfaces (APIs) for developing and porting file service protocols (such as NFS).

In the processors of controller servers 28, 29, a software application is run by a general purpose operating system such as Microsoft NT, and a network client communicates service requests to the video file server only through the software application executing on an active one of the controller servers 28, 29. This software application executes as a central control to prevent the video file server from performing conflicting operations in response to concurrent requests from various network clients. For example, the video file server should not erase a file for one client while data from the file is being streamed to another client.

The software 60 includes a file system 61 for controlling transfer of data between the network 25 and the disk array (47 in FIG. 2) or tape silo (24 in FIGS. 1 and 2). A buffer cache 62 composed of part of the random-access memory of the stream servers 21 is used as a buffer for this data transfer.

The software 60 also includes a kernel program 63 for providing a real-time scheduler and an access control program for arbitrating among conflicting service requests. The kernel program 63 separates control information (file access and synchronization protocols) from the underlying data stream. The application software running on an active one of the controller servers 28, 29 includes an admission control program. The kernel program 63 includes a real-time scheduler. The admission control program running on the active one of the controller servers 28, 29 applies an admission control policy to determine whether a service request can be satisfied, and if so, sends the stream servers 21 appropriate control messages that invoke their real-time schedulers to schedule operations to satisfy the service request. The admission control policy considers the global resources available to satisfy the request, including the current loading of the stream servers 21, the integrated cached disk array 23, and the tape silo 24. If the request requires an operation of a stream server 21, one of the stream servers is selected to perform the required operation, and the active one of the controller servers 28, 29 transmits an associated operational command over the local Ethernet (26 in FIG. 2) to the selected stream server. Each of the stream servers 26 includes a real-time scheduler to schedule the local operations required to satisfy an operational command from the active one of the controller servers 28, 29. Preferably, one or more of the stream servers 21 are kept in a standby mode, to be used as "hot spares" or replacements for any one of the other stream servers that fails to acknowledge commands from the active one of the controller servers 28, 29 or is otherwise found to experience a failure.

The software 60 further includes an SNMP management agent 64 supporting a Simple Network Management Protocol. SNMP is a standard internet protocol for inspecting and changing system variables. For example, the SNMP management agent is used when an operator at the media server display and keyboard (32 in FIG. 1) sets the network IP address of the video server (20 in FIG. 1).

Figure 5:
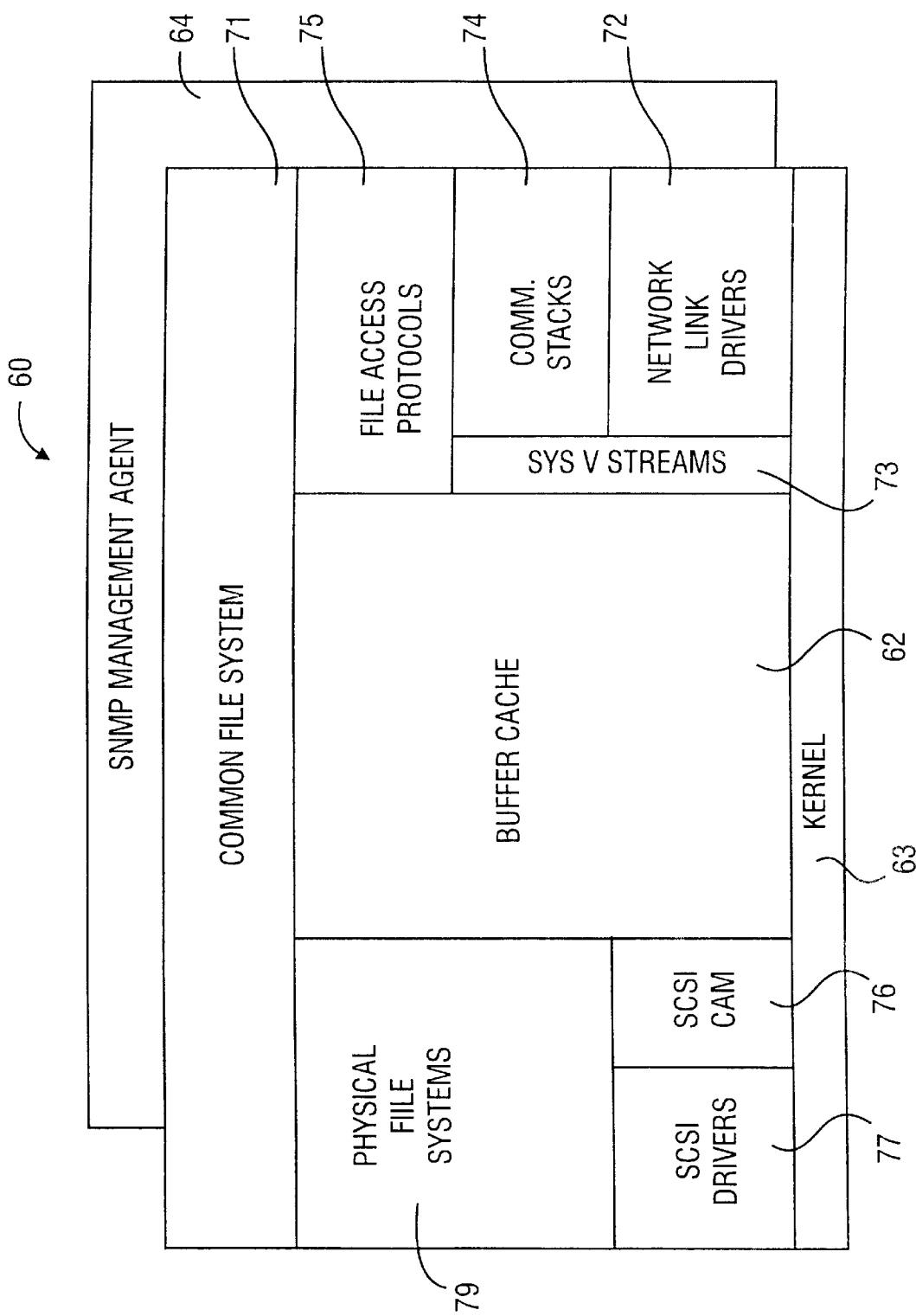
FIG. 5 is a more detailed block diagram showing various modules of the software structure of FIG. 4.

Turning now to FIG. 5, there is shown a more detailed block diagram of the software structure 60. The file system 61 in FIG. 4 has been expanded into its components. These components are a common file system 71, a group of software modules providing communication between the common file system and the network, and a group of software modules providing communication between the common file system and the integrated cached disk array 23 or tape silo 24. The common file system 71 uses the Virtual File System (VFS), which is an industry-standard back-end file system switch, to interface with the physical file systems 79. VFS translates NFS Common File System requests, and permits NFS access to CMFS movie files for editing. (The NFS Common File System Requests in themselves are translations of NFS requests to the intended physical file storage devices. NFS is one of the file access protocols 75.) The common file system 71 accesses the buffer cache 62 during data transfers between the network (25) and disk or tape storage (23, 24).

The group of software modules providing communication between the common file system and the network includes file access protocols 75 and a network server interface 73 using communication stacks 74 and network link drivers 72. The file access protocols 75 include a set of industry standard network server protocols such as NFS, as well as protocols for audio/video services, such as CMFAP. CMFAP is a continuous media file access protocol which provides functions such as opening a movie, playing a movie, stop play of a movie, and "fast forward" and "fast reverse" functions. Other file access protocols compatible with the network 25 could also be used, such as Novell NCP, LanManager, SMB, etc.

The file access protocols 75 are layered between the communication stacks 74 and the common file system 71. The communication stacks 74 provide the network access and connectivity for the data transmitted to the file access protocol layer 75 from the network link drivers 72. The communication stacks include TCP/IP, IPX/SPX, NETbeui, or others. The network server framework 73 allows porting of the network software and file access protocols 72, 74, 75.

This framework 73 is System V Streams. There could be multiple concurrent instances of the file access protocols 75, communication stacks 74, and drivers 72.

The group of software modules providing communication between the common file system and the integrated cached disk array 23 or tape silo 24 includes physical file systems 79 and SCSI CAM 76 which provides a standard framework (SCSI Common Access Method) to the SCSI bus drivers 77. The physical file systems 79 include a continuous media file system (CMFS) and at least one conventional industry standard-based file system such as the Unix ufs file system. Other industry standards-based file systems could also be used, such as VxFS, ISO9660, etc. The buffer cache 62 buffers data passed between the SCSI drivers 77 and the physical file system 79. There could be multiple concurrent instances of the network drivers 72, communication stacks 74, file access protocols 75, SCSI drivers 77, and physical file systems 79.

Figure 6:
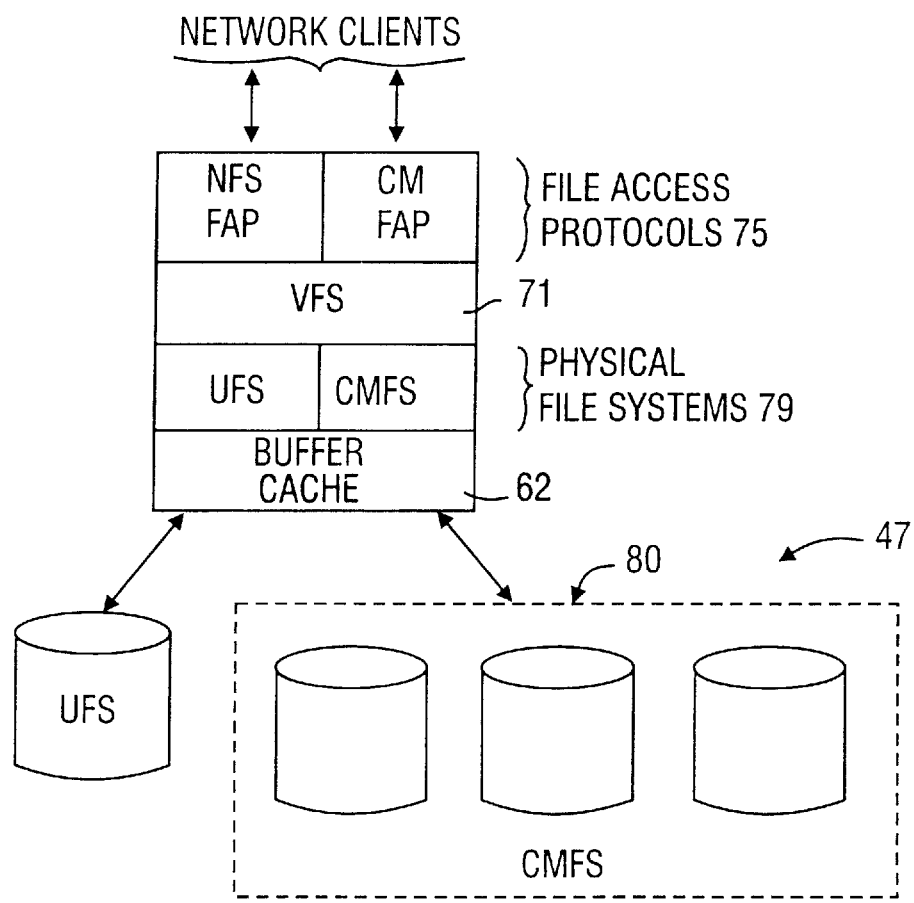
FIG. 6 is a specific example of software modules of FIG. 4 that can be used in an interactive video application to provide transaction processing and continuous media file access.

FIG. 6 is a specific example of software modules of FIG. 5. Two physical file systems are exported onto the network: a conventional UNIX File System (UFS) and a Continuous Media File System (CMFS) 80. CMFS is a component of a software package available from EMC Corporation, 171 South Street, Hopkinton, Mass., 01748-9103. CMFS may be mounted on a directory within the UFS hierarchy, or it may be mounted on the root directory '/' as a stand-alone root file system. Both UFS and CMFS are exported onto the network using NFS. The file system switch that directs client NFS requests to the intended physical file system is implemented using a standard virtual file-system (Vnode/VFS) interface.

In addition to NFS, the file server supports a real-time Continuous Media File Access Protocol (CMFAP) for accessing CMFS. CMFAP provides a VCR-like functionality that includes commands to Play, Record, Pause, Restart, and Rewind. CMFAP also supports a set of management commands for opening and closing streams, listing all active streams, and redirecting an active playback stream to an alternate display destination. CMFAP may not be used for accessing UFS, but only for accessing CMFS.

The design of CMFS is guided by the following assumptions: (1) the majority of files in a video-on-demand system are large, on the order of a few hundred megabytes to a few tens of gigabytes; (2) access patterns are predominantly read-only; that is most files are accessed for real-time playback; and (3) most files are complete in that they contain interleaved audio and video, as opposed to having related audio and video data stored in two separate files. These assumptions suggested an extent-based approach to the design of CMFS on-disk structures. An extent-based file system allocates file space in large contiguous disk chunks called extents; the size of an extent is a system parameter. Extents of an appropriately chosen size promote file contiguity, simplify disk space management, and are well suited for large files. File contiguity benefits performance in the environment where most files are accessed for read-only, which is a design assumption. Assuming that most files contain interleaved audio and video, there is no need to leave gaps between blocks in anticipation of filling the gaps with frames of a related stream.

CMFS may span several disks. All disks that comprise CMFS are collectively called the CMFS volume set 80. When a new CMFS file is created, it is written to the disk that contains more free blocks than any other disk within the volume set. The reason for multi-disk volume sets is to increase capacity rather than provide load balancing. Load balancing may be accomplished by exporting multiple file systems.

Each disk in the CMFS volume set is divided into two areas: the data area and the inode area. The data area is used to store file data, while the inode area is used to store inodes that hold file metadata. In addition to the standard file metadata information, the inode contains an array of extent descriptors that locate each extent comprising the corresponding file. An extent descriptor may also point to an inode located on another disk. Such a descriptor is used to point to a continuation inode when a CMFS file spans multiple disks.

The file server software runs as an embedded system that includes a real-time kernel (63 in FIGS. 4 and 5). The main components of the kernel are a task scheduler, frameworks for writing device drivers, and a number of system services that are commonly found in similar real-time kernels. The system services include kernel interfaces to memory management, timers, synchronization, and task creation.

All kernel tasks run in a single unprotected address space. As a result of this, no copy operations are required to move data from disk to the network. Copying is eliminated by passing references to common buffers across all subsystems. Considerable efficiency is obtained for the video-on-demand service because of the elimination of copy operations by the processor. The only "incremental" work involved in transmitting a frame is due to cycle stealing by the DMA devices for moving data to and from memory. As a result, the predominant component of the service time for transmission of a frame is fixed, even though the size of the frame may vary, depending on the compression algorithm. The kernel exploits the fixed service time per frame in the scheduling and admissions control policy that is described below.

Even a simple video file server that provides playback only needs to receive data from the network and store it on disk. This happens when loading movies from the network. When data are received from the network, a single copy operation is used to move data from the network to the disk. Although the service time for receiving a frame varies according to the frame size, the service time for a network fragment of the frame is fixed (because of a fixed MTU packet size). The fixed per packet service time is used in the scheduling and admissions control policy for real-time tasks that receive network data.

III. The Kernel Scheduler

The kernel 63 uses the scheduler and admission control policy described in K. K. Ramakrishnan et al., "Operating System Support for a Video-On-Demand File Service," *Multimedia Systems*, Vol. 3, Springer-Verlag, 1995, pp. 53–65.

Three classes of schedulable tasks are supported: general-purpose, real-time, and isochronous tasks. These classes correspond to different kinds of requests that are likely to exist in a video-on-demand system. Real-time and isochronous tasks are known in the real-time literature as aperiodic and periodic tasks, respectively.

The design of the CPU scheduler is based on a combination of weighted round-robin and rate monotonic scheduling procedures. Tasks within the isochronous class are scheduled using a rate-monotonic procedure, while the real-time and general-purpose tasks are scheduled using the weighted round-robin scheme. The isochronous class is given the highest priority; that is, any task within the isochronous class always pre-empts a real-time or a general-purpose task.

Figure 7:
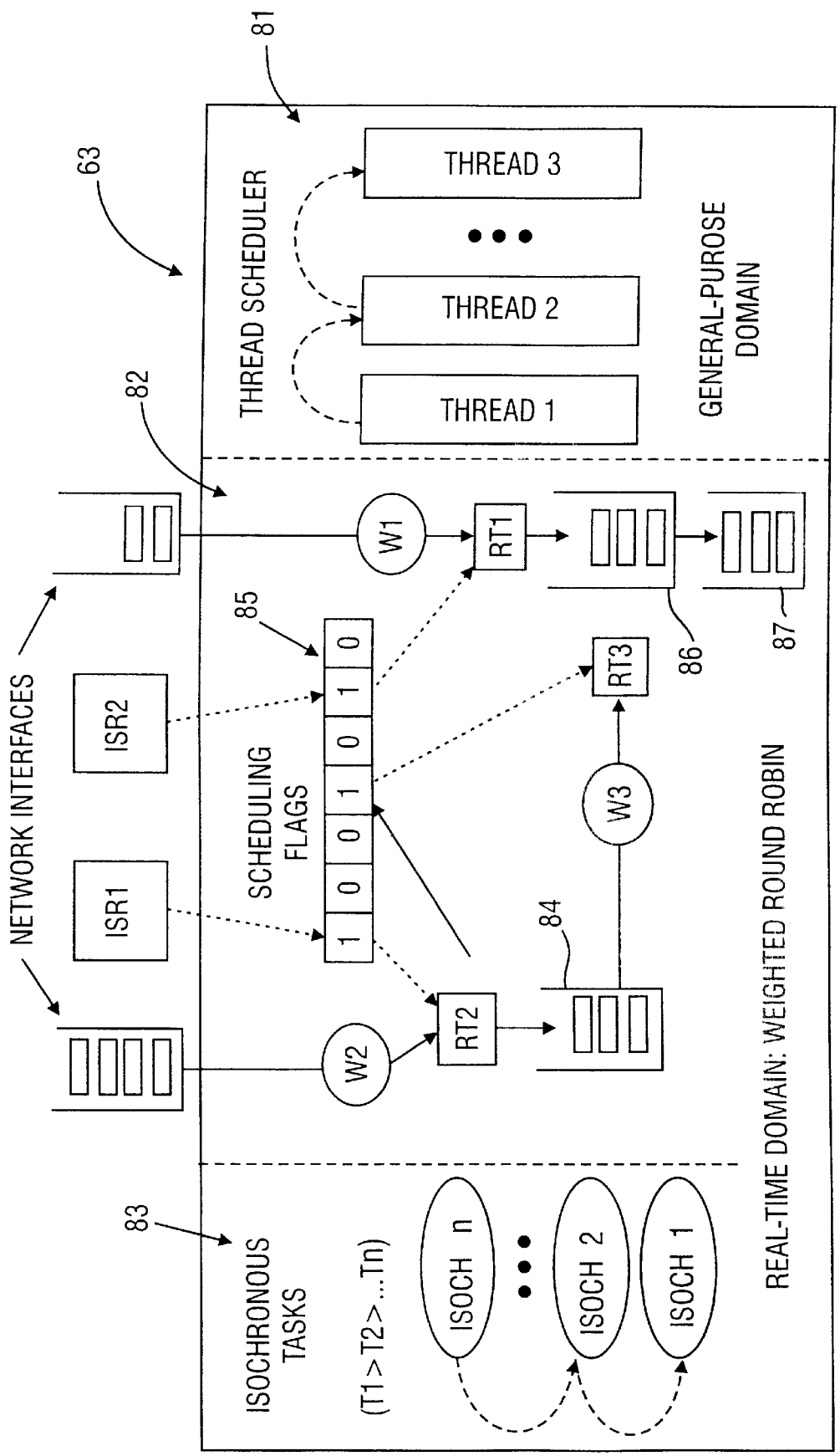
FIG. 7 is a schematic diagram illustrating scheduling operations by a kernel software module of the video file server of FIG. 1.

Turning now to FIG. 7, there is shown a high level view of the kernel program 63 and its processing of the three classes of schedulable tasks; namely, the general-purpose tasks 81, the real-time tasks 82, and the isochronous tasks 83.

The general-purpose class supports pre-emptible tasks that are suitable for low-priority background processing. In order to ensure that general-purpose tasks can always make progress, this class is granted a minimum CPU processing quantum.

The general-purpose class is implemented as a standard threads package, with a thread corresponding directly to a general-purpose task as described herein. A suitable threads package is described in A. D. Birrell, "An Introduction to Programming with Threads," Systems Research Center Technical Report, No. 35, Digital Equipment Corporation, Maynard, Mass., (1989).

The real-time class is suitable for tasks that require guaranteed throughput and bounded delay. Real-time tasks are not pre-emptible; however, a software provision is made to allow for the existence of safe "preemption windows" in which all isochronous tasks can be executed. A weight and a scheduling flag is assigned to every real-time task. The weight is used as the means to limit the amount of processing time taken by the real-time task at each invocation. The scheduling flag is used to indicate that the task has pending work and to signal the scheduler that the task needs to be invoked. The scheduling flag may be set by an interrupt service routine or a task of any class.

In the video file server, real-time tasks are used to implement "polling" device drivers and communication stacks. The method of polling for pending work, as opposed to interrupt-driven processing, contributes to system stability and alleviates most of the problems that arise during overloads. It also provides isolation between multiple real-time tasks that have differing performance requirements. Polling regulates the flow of traffic into the video file server. Just as flow control mechanisms, such as a leaky bucket scheme, protect network resources from large bursts, polling protects the end-system resources by regulating the frequency at which work queues are scanned and limiting the amount of work that may be performed during each scan of the round-robin schedule.

The real-time tasks are implemented as callable routines. Invoking a real-time task amounts simply to a procedure call.

The isochronous class supports real-time periodic tasks that require performance guarantees for through-put, bounded latency, and lower jitter. Low jitter reduces the amount of buffering needed at the client, which in turn improves the response time of interactive video applications. The isochronous tasks that support streams of different periods are assigned priorities (w1, w2, w3, etc.) on a rate-monotonic basis (i.e., a task with a higher frequency has a higher priority). Isochronous tasks also allow for a safe "preemption window" in which all higher priority isochronous tasks can be executed. Isochronous tasks are used to schedule periodic network transmission of audio and video frames. An isochronous task executes exactly once per period. In the preferred implementation, a single isochronous task services all client streams that have the same frame rate.

The scheduler executes isochronous tasks from a "Ready" queue 84 in which all isochronous tasks that are ready to run are arranged in order of decreasing priority (a task with the lowest period has the highest priority and resides at the head of the queue). An isochronous task is inserted in its appropriate place on the "Ready" queue 84 upon arrival. The arrival of isochronous tasks is generated by period timers. A unique periodic timer exists in the system for each distinct period among all the admitted isochronous tasks.

Whenever an isochronous task arrives, the scheduler determines whether a currently running task needs to be pre-empted. If the currently running task is a general-purpose task, it is pre-empted by the newly arrived isochronous task. If the currently running task is a real-time task, it will be pre-empted by the newly arrived isochronous task in the next "preemption window". If the currently running task is of the isochronous class, the scheduler compares its priority to that of the task currently at the head of the "Ready" queue 84. If the priority of the current task is lower, it is pre-empted at the next "preemption window" by the isochronous task from the head of the queue. The scheduler continues to execute isochronous tasks until the isochronous "Ready" queue 84 becomes empty. Whenever the queue is empty, the scheduler alternates between the real-time and general-purpose classes using a weighted round-robin scheme.

Selecting a real-time task involves scanning the set of scheduling flags 85; for each flag that is set, the scheduler invokes the corresponding task with the assigned weight as a parameter. The real-time task is expected to process at most the number of work units equal to the task's weight that was passed to it as a parameter. At the completion of each unit of work, the real-time task opens up the "preemption window" which is used by the scheduler to run all the isochronous tasks that may have arrived in the time it took the real-time task to process one unit of work. Upon exhausting the allowed number of work units (the weight) or less, the task voluntarily returns to the scheduler. After having completed one round of scanning the flags, the scheduler switches to the general purpose class.

General purpose tasks that are ready for execution are placed on a "GP ready" queue 86, which in our current implementation is served in a round-robin fashion. If the "GP ready" queue 86 is empty, the scheduler initiates a new round of servicing the real-time tasks. Otherwise, the scheduler starts the general-purpose quantum timer, and activates the first task from the "GP ready" queue 86. The task runs until it blocks or the quantum timer expires. If the task blocks, its context is saved on a wait queue 87 and the next task from the "GP ready" queue 86 is restored for execution. If the quantum timer expires, the scheduler saves the context of the currently running task at the end of the "GP ready" queue 86 and switches to a new round of servicing the real-time tasks. The execution of the general-purpose tasks may be preempted one or more times by the isochronous tasks. The execution of the general-purpose class continues after each preemption until the total time spent in processing general-purpose tasks reaches the guaranteed quantum.

In the absence of isochronous tasks, the scheduler can provide guarantees on throughput and delay bounds for real-time tasks (this assumes that all requests destined for a real-time task generate a constant amount of work). A maximum service delay is the time it takes to complete one round of real-time tasks scheduling plus the general purpose time quantum. Let R denote this maximum service delay in steady state. Weights may be assigned to real-time tasks to allocate and guarantee bandwidth averaged over the maximum service delay, R. If W denotes the weight given to a real-time task (the number of units of this task, or requests, processed in one round), then the task's steady state throughput is (W/R) requests per unit time.

An admission control policy is employed in order to ensure that a feasible schedule exists for all the admitted tasks; that is, all the admitted tasks can be scheduled using the combination of rate monotonic and weighted round-robin scheduling procedure described above without violating any performance guarantees. The admission control policy for access to processor resources balances the needs of the three classes of tasks: throughput and maximum delay requirements of the real-time tasks, a minimum guaranteed CPU quantum for the general-purpose tasks, and the periodic deadline-sensitive nature of the isochronous tasks. The admission control policy uses a time-based admission test for rate monotonic (isochronous) tasks with an adjustment to account for tolerable delay constraints imposed by the real-time tasks, with an adjustment to account for tolerable delay constraints imposed by the real-time tasks. Let $L_r$ denote the maximum delay that can be tolerated by any of the real-time tasks. Then a feasible schedule exists for a set of n isochronous tasks and m real-time tasks if the following two conditions hold true:

$$\sum_{i=1}^{n} C_i \times \left[ \frac{L_r}{T_i} \right] + \sum_{j=1}^{m} W_j \times r_j + Q \leq L_r \quad (1)$$

where $C_i$ run-time requirement of isochronous task i $T_i$ the period of isochronous task i $w_j$ weight assigned to real-time task j $r_j$ run-time required by the real-time task j to process one request Q time quantum assigned to the general-purpose class, i.e., GP class runs Q units of time every time interval of length $L_r$.

As noted above, $C_i$ is a fixed time per execution of isochronous task i. In the second step a test must be applied to each isochronous task i to ensure that its execution requirements can be fulfilled in the presence of all higher priority isochronous tasks. The test is as follows $$\text{FOR } i = 1 \text{ TO } n \quad (2)$$
$$\sum_{j=1}^{n} C_j \times \left[ \frac{T_i}{T_j} \right] \leq T_i, \forall_j/T_j \leq T_i$$

In order to admit an isochronous task, both conditions need to be verified. However, in order to admit a real-time task, only the first condition needs to be verified.

It is convenient to describe the disk scheduling and admission control for access to storage devices by viewing the video file server operating in steady state. The steady state operation the video file server consists of servicing n streams at the rate of $R_i$ bytes/second for each stream (i.e., $R_1$ is the ith stream's playback rate). For each stream the video file server maintains two buffers: a disk buffer and a network buffer. In steady state, a network task empties the network buffer and a disk task fills up the disk buffer. The two operations are performed in parallel. The rate at which the network buffer is emptied needs to be equal to the rate at which the disk buffer is filled up; the goal is that both rates are the same as the stream's playback rate. When the network buffer is empty, the disk buffer is full. At that moment the buffers interchange their roles. The disk buffers are filled up for all the streams in a round-robin fashion. One round of filling up the disk buffers of all streams is known as the disk round-robin service time. We assume that disk transfers are not pre-emptible.

The admission control policy needs to ensure that the steady state operation of the video file server, as described above, is feasible. A new stream can be admitted if the following three conditions are satisfied. First, the rate at which the disk buffers are filled is greater or equal to the rate at which the network buffers are emptied. Second, sufficient buffer space exists for allocating disk and network buffers to all admitted streams, including the newly admitted stream. And third, the disk service time for all the streams does not exceed the minimum tolerable request latency. Request latency is the amount of time that elapses from the moment the server receives a request for the first frame of a stream until the moment the first frame is placed on the network. This is required in order to support interactive video applications, such as games.

The first condition is expressed by the following constraint:

$$\sum_{i=1}^{n} Ri \leq D_{min} \quad (1)$$

where $R_i$ bytes/second is the playback rate of stream i and $D_{min}$ bytes/second is the minimal disk rate, including seek times, at which n disk buffers can be filled. It may be computed as follows $$D_{min} = \frac{Rd}{1 + n \times S_{max}} \quad (2)$$

where $R_d$ bytes is the amount of contiguous data that the disk can transfer in 1 second, (without any seeks involved), and $S_{max}$ is the maximum disk seek time. It is assumed that in between servicing each stream, the disk has to perform a maximum seek.

The second condition is expressed by the following constraint:

$$\sum_{i=1}^{n} B_i \leq M \quad (3)$$

where $B_i$ is the size of the disk buffer allocated to stream i, and M is the total amount of system memory from which the disk buffers are allocated. An equivalent amount of memory is available from which network buffers are allocated. $B_i$ bytes is the amount of data transferred from disk for session i during one round of the round-robin service for the admitted streams. Strategies for choosing an appropriate size for disk buffers are discussed below.

The third condition is expressed as follows:

$$T = \frac{\sum_{i=1}^{n} Bi}{D_{min}} \leq L \quad (4)$$

where T denotes the maximum time taken by one round of filling up the disk buffers of all the streams (i.e., T is the sum of the disk service times for all streams in one round), $B_i$ and $D_{min}$ are given by equations (2) and (3), and L is the smallest among the maximum request latencies tolerated by any of the streams.

While describing conditions 2 and 3 for the admission control, we referred to $B_i$, the size of a disk buffer allocated to stream i, without specifying how this size is chosen. In this section we discuss two strategies for choosing the disk buffer sizes, which is equivalent to determining the amount of data that should be transferred from the disk for each session during one round.

The "optimal strategy" is the one in which the amount of data transferred from disk for each stream is proportional to the stream's playback rate. The constant of proportionality is the disk service time for one round. The strategy is described as follows. Let $\underline{M}$ bytes denote the total amount of system memory from which the disk buffers are allocated for all streams. Then the maximum time taken by one round of filling up the disk buffers of all the streams is $$T = \frac{M}{D_{min}} \quad (5)$$

where $D_{min}$ is the same as in equation (2). T is used as the constant of proportionality for sizing the disk buffers. The rate at which buffers are filled is $(\Sigma B_i)/T$. The rate at which network buffers are drained is $\Sigma R_i$. The simple constraint therefore is $\Sigma B_i/T \geq \Sigma R_i$. This is simplistically satisfied for each stream if $B_i = T R_i$, where $B_i$ is the size of the disk buffer and the size of the disk read block for stream $i$, and $R_i$ is the stream's playback rate.

Thus, each stream consumes its network buffer in time T which is the exact amount of time needed by the round-robin service to fill up the disk buffers for all the streams. If any stream $i$ reads more than its computed buffer size $B_i$, then the round-robin time will take longer than T, causing some streams to starve. Similarly, if a stream i reads less than its computed buffer size $B_i$, then additional seeks are introduced, causing unnecessary overhead for that stream and reducing $D_{min}$. Thus, the chosen disk buffer size $B_i$ must be optimal for each stream.

Unfortunately, the optimal strategy suffers from two practical limitations. First, the disk round-robin service time T needed to compute each $B_i$, depends on the number of currently active streams (that is, $D_{min}$ depends on n in (2)). Thus, $T$ varies each time a new stream is admitted, or a previously active stream terminates. In order to comply with the optimal strategy during such transitions, it is necessary to re-size the disk buffers and readjust the amount of data that is read from the disk for each stream. Dynamically re-sizing the disk buffers may not be practical from an implementation point of view.

The second limitation of the optimal strategy is that a large amount of buffer space $M$ may lead to an unreasonably large size of some disk buffer $B_i$. It is unreasonable in the sense that it could greatly exceed the practical size for a disk read request. In this case, the disk buffer $B_i$ would need to be filled up by several disk reads, possibly resulting in an unpredictable number of disk seeks, if the file is not entirely contiguous.

The second strategy is designed to overcome the practical limitations inherent in the 'optimal strategy'. In this "practical strategy" we impose a constraint that $B_i$ does not exceed $B_{max}$, where $B_{max}$ is chosen to be a reasonable size for a disk read request. The disk buffer sizes are still allocated in proportion to the playback rate as follows:

$$B_i = B_{max} \times \frac{R_i}{R_{max}}$$

where $R_{max}$ is the maximum playback rate, assumed to be known a priori.

This strategy, although practical for the purposes of implementation, is suboptimal in the theoretical sense that it will admit fewer streams than the "optimal strategy".

The disk scheduling and admission control procedures described above ensure that the playback rates of "real time" streams are satisfied. "Real-time" streams are those streams that require guaranteed response (served both by isochronous and real-time tasks). However, the real-time streams may not consume the entire disk bandwidth. In this case, it is desirable to specify a procedure by which non real-time disk requests (such as NFS) can receive the unused disk bandwidth without interfering with the real-time disk access requests.

A simple case is the one in which the playback of each stream occurs at a constant bit-rate. This situation arises when the video is recorded in its original uncompressed form (frame sizes are constant) or when the video is compressed at a constant bit-rate (MPEG I, for example). In the case of a constant playback rate, all real-time disk requests may be issued to the disk exactly at the beginning of every interval of length T (T is the worst case round-robin service time as computed in the previous section). Let k denote the number of active real-time streams. Then the number of real-time requests that may be issued to the disk every T period is n–k, where n is the maximum number of streams supported by the system, as was described in the previous section. The non real-time requests may be issued at any time within the interval T, as long as the round time to service k real-time streams plus the data transfer time of the non real-time requests does not exceed T.

Figure 8:
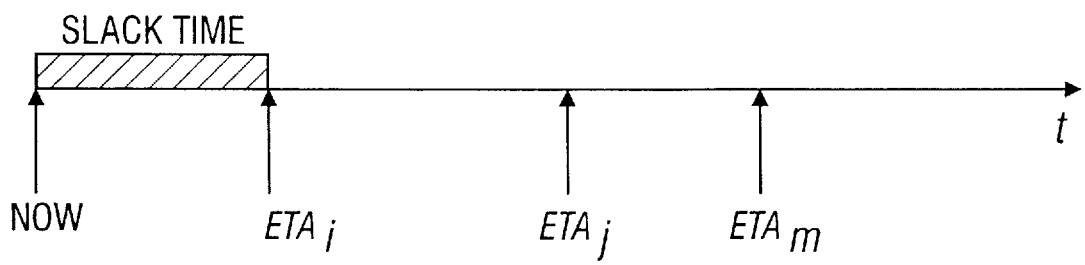
FIG. 8 is a timing diagram showing the accommodation of non real-time request by the kernel software module of the video file server of FIG. 1.

A more complicated case arises when the playback of each stream occurs at a variable bit-rate (such as in motion JPEG, for example). In this case the admission control policy makes a conservative admission decision based on the assumption that the playback rate for each stream proceeds at a constant frame rate using the stream's maximum frame size. Variations from the maximum frame size, however, are used to accommodate non real-time requests, as described below. Since the network buffer empties at a variable rate, it is not possible to issue all the real-time disk requests at the beginning of every period of length T, as was the case with the constant playback rate. Each stream issues a disk read request as and when its network buffer becomes empty. Thus disk requests arrive at various times. For each real-time stream we maintain a sorted queue of the estimated time of arrival (ETA) of the next read request. As shown in the timing diagram of FIG. 8, the queue is sorted in increasing time order. Notice from FIG. 8 that a non real-time disk read may be issued in the slack time—an interval whose end points are now and the first ETA on the queue (ETA for session i).

Initially, the ETAs are computed based on draining the network buffer at the maximum rate. However, as each variable-sized frame is transmitted, its deviation from the maximum frame size is used to adjust the ETA of the corresponding stream. The adjustment involves moving the ETA forward in time, since the network buffer will hold data longer than the original worst case estimate based on the maximum frame size. The adjustment potentially increases the interval (slack time) in which the non-real time disk requests may be issued.

A drawback of the procedure described above is that its implementation may become computationally expensive since it involves sorting a potentially long queue of ETA entries. Therefore, an alternative procedure is considered for accommodating non real-time requests. The alternative procedure retains the ability of the previous procedure to accommodate non real-time requests during "slack" periods, while substantially reducing its computational complexity.

In the alternative procedure, some portion of the disk bandwidth is permanently allocated to non real-time requests. Let us denote this bandwidth in terms of the number of non real-time requests m that may be issued to the disk during each interval T (T is the worst case round-robin service time as computed in the previous section). Thus each interval of length T is allocated m credits for issuing non real-time requests. The procedure considers two cases: one in which a non real-time request arrives when credits are still available (m>0), and the other in which a request arrives when no credits are left (m=0).

In the first case (m>0), a request is issued to the disk and the number of credits for this interval is decremented by one. If the request completes in the same interval in which it was issued and the number of credits reaches zero, then the number of credits for this interval is incremented by one. If the request completes in the interval following the one in which it was issued, then the number of credits in this new interval is decremented by one.

In the second case (m=0), a credit is borrowed from the next interval, provided that the number of credits available for the next interval is greater than zero. A request issued on a borrowed credit always completes in the interval following the one in which it was issued, otherwise credits would have been available in the current interval. If the request completes before any of the real-time requests need to be issued in the new interval, then the borrowed credit is returned to the current interval (this is the interval from which the credit was borrowed previously).

The basic difference between the two procedures is that in the alternative procedure it is required to reserve a portion of the disk bandwidth for non real-time requests. While the previous procedure accommodates non real-time requests during the "slack" periods only, the alternative procedure accommodates these requests both during "slack" times and "reserved" times. The alternative procedure is more compatible with our CPU scheduling policy which guarantees progress to non real-time requests.

It may also be possible to accommodate non real-time requests simply by using two priority queues: a low priority for non real-time requests and a high priority for real-time requests. In order for such a scheme to work correctly, it is necessary to implement the priority queues at all levels including the lowest level that maintains queued disk requests, such as the disk adapter or the driver level. This scheme also requires that some portion of the disk bandwidth be reserved for non real-time requests.

IV. Prefetching to Service Multiple Video Streams

One advantage to the video server architecture of FIG. 2 is that multiple video streams requested by multiple network clients can sometimes be serviced from the cache memory 41 of the ICDA 23 without always fetching the video data from the disk array 47. This situation is illustrated in FIGS. 9 and 10.

Figure 9:
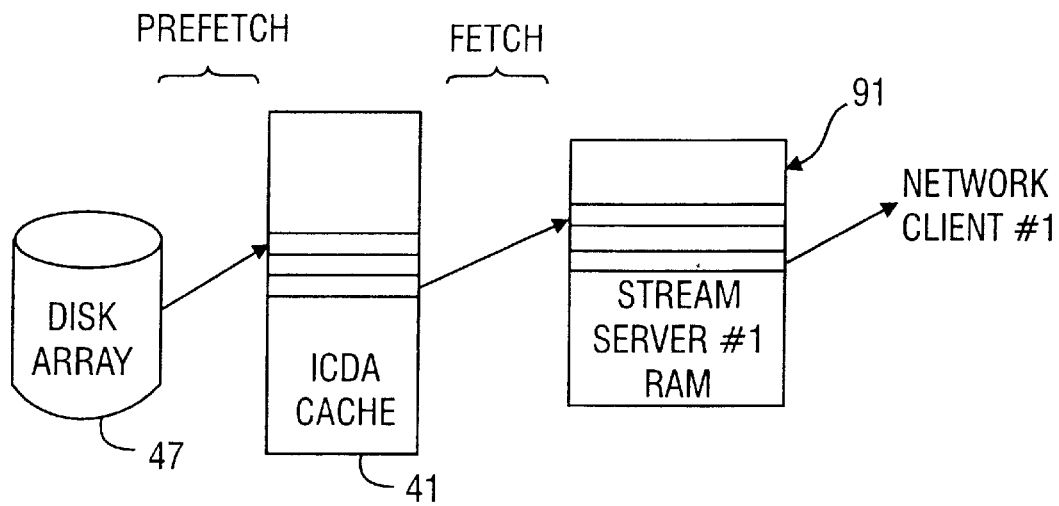
FIG. 9 is a schematic diagram illustrating data flow in the video file server of FIG. 1 from the disk array to a network client.

In FIG. 9, video data are transmitted isochronously to a first network client from a buffer 91 in random access memory (RAM) in a first one of the stream servers (21 in FIG. 2). The buffer 91 is filled by data fetched from the cache 41 of the integrated cached disk array (23 in FIG. 2). The cache 41 is filled by data prefetched from the disk array 47.

Figure 10:
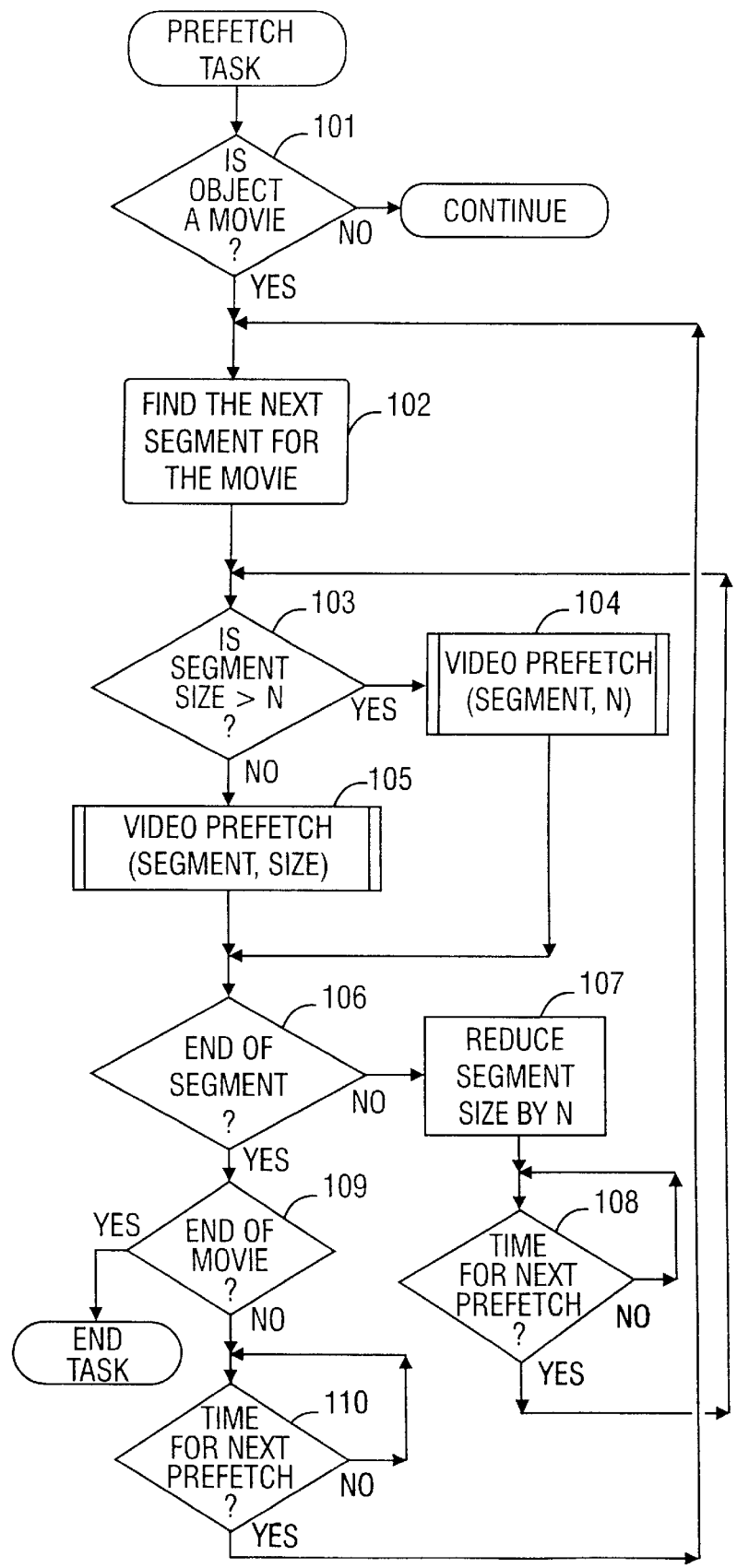
FIG. 10 is a flowchart of a prefetch task of a stream server in the video file server of FIG. 1.

Turning now to FIG. 10, there is shown a flowchart of a prefetch task including steps for scheduling the transmission of video prefetch commands from one of the stream servers (21 in FIG. 2) to the integrated cache disk array (23 in FIG. 2). As indicated for a first step 101, the video prefetch commands are used when the object being accessed by the stream server is a movie. If so, then in step 102 the stream server finds the next segment for the movie. The media server controller, for example, accesses a movie directory to obtain a list of the addresses of the movie segments in the integrated cached disk array and the size or length of each segment, and transmits this list to the stream server as the object to be accessed. In step 102, the stream server obtains from this list the next segment address and the size of the next segment. Then in step 103 the stream server compares the size of this segment to a predetermined number N which is a limit on the amount of data to be prefetched in response to a single video prefetch command. If the segment size is greater than the number N, then in step 104 only a beginning portion of size N of this segment is prefetched by issuing a video prefetch command to the ICDA (23 in FIG. 2); the rest of this segment is prefetched in one or more subsequent iterations beginning again in step 103. Otherwise, in step 105, the entire segment is prefetched by issuing a video prefetch command to the ICDA (23 in FIG. 2). After steps 104 or 105, in step 106 execution branches to step 107 if the end portion of the segment has not been prefetched. In step 107 the segment size is reduced by N, in effect truncating the prefetched portion of the segment. After step 107, the prefetch task is suspended in step 108 until it is time for the next video prefetch command (issued in steps 104 or 105), and then execution loops back to step 103 to continue prefetching the remaining portion of the segment. Otherwise, at the end of the segment, in step 109 the prefetching task is ended if there are no more segments of the movie to prefetch. If there are more segments of the movie to prefetch, in step 110, the prefetch task is suspended until it is time to prefetch the next segment.

There is a fetch task that is similar to the prefetch task shown in FIG. 10, except that a video fetch command instead of a video prefetch command is issued in the fetch task steps corresponding to steps 104 and 105. The time for the next fetch command is established by the requirement of isochronous video data delivery to the network client having requested the video data. Data are fetched sufficiently in advance of the required time for isochronous video delivery to the network client. The time for the next prefetch operation is established by synchronization between the prefetching of the movie with the fetching of the movie. Data are prefetched sufficiently in advance of its fetch time to guarantee that the data are in the ICDA cache when the ICDA receives the fetch command.

Figure 11:
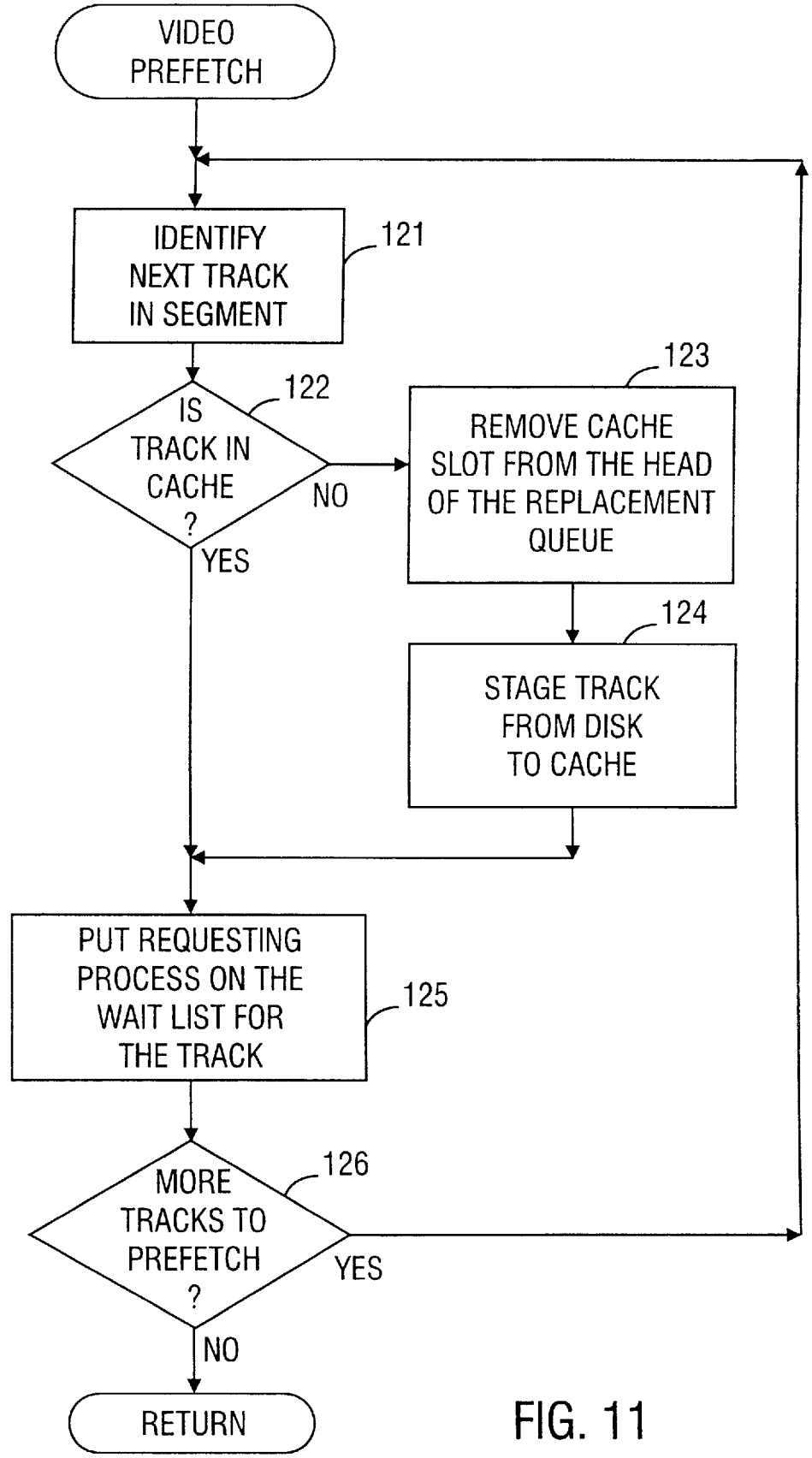
FIG. 11 is a flowchart of a video prefetch procedure of an integrated cached disk array in the video file server of FIG. 1.

Turning now to FIG. 11, there is shown a flowchart of a video prefetch routine performed by the ICDA in response to a video prefetch command from a stream server. The video prefetch routine ensures that data specified by the video prefetch command will be in the ICDA cache at the time that the ICDA receives a subsequent fetch command from the stream server. The execution of a video prefetch routine differs from a conventional ICDA synchronous prefetch operation by ensuring that the video prefetch routine is executed on a high priority basis, and by ensuring that the prefetched video data are retained in the ICDA cache until the subsequent prefetch command is serviced.

In a first step 121, the ICDA channel director (43 in FIG. 3) having received the prefetch command identifies the next track in the video segment being prefetched. Next, in step 122, a cache directory in the cache memory (41 in FIG. 3) is inspected to determine whether the track is in the cache memory. If not, then in step 123, a cache slot is allocated to receive the track by removing the cache slot from the head of a "replacement queue" that keeps track of the "least recently used" cache slot or otherwise implements a replacement algorithm for the ICDA cache. After step 123, in step 124, the track is staged from the disk array 47 and loaded into the cache slot.

If the track is found to be in the cache in step 122, or after the track is staged into the cache from disk in step 124, then in step 125 the requesting process is placed on a wait list for the track. In this fashion, the track can be retained in the cache until it is fetched by the process. In step 126 a time stamp for the track could also be reset to the current time, and used by a background process in the ICDA to determine whether any track has been retained in the cache for any inordinate amount of time due to a failure of the process to fetch the video data from the cache. Upon finding that a track has been retained in the cache for an inordinate amount of time, the background process would return the cache slot to the head of the replacement queue and report to the video server manager that the process or processes on the wait list have experienced an error.

In a final step 126, execution loops back to step 121 if there are any more tracks in the video segment that need to be prefetched. If not, execution returns.

Figure 12:
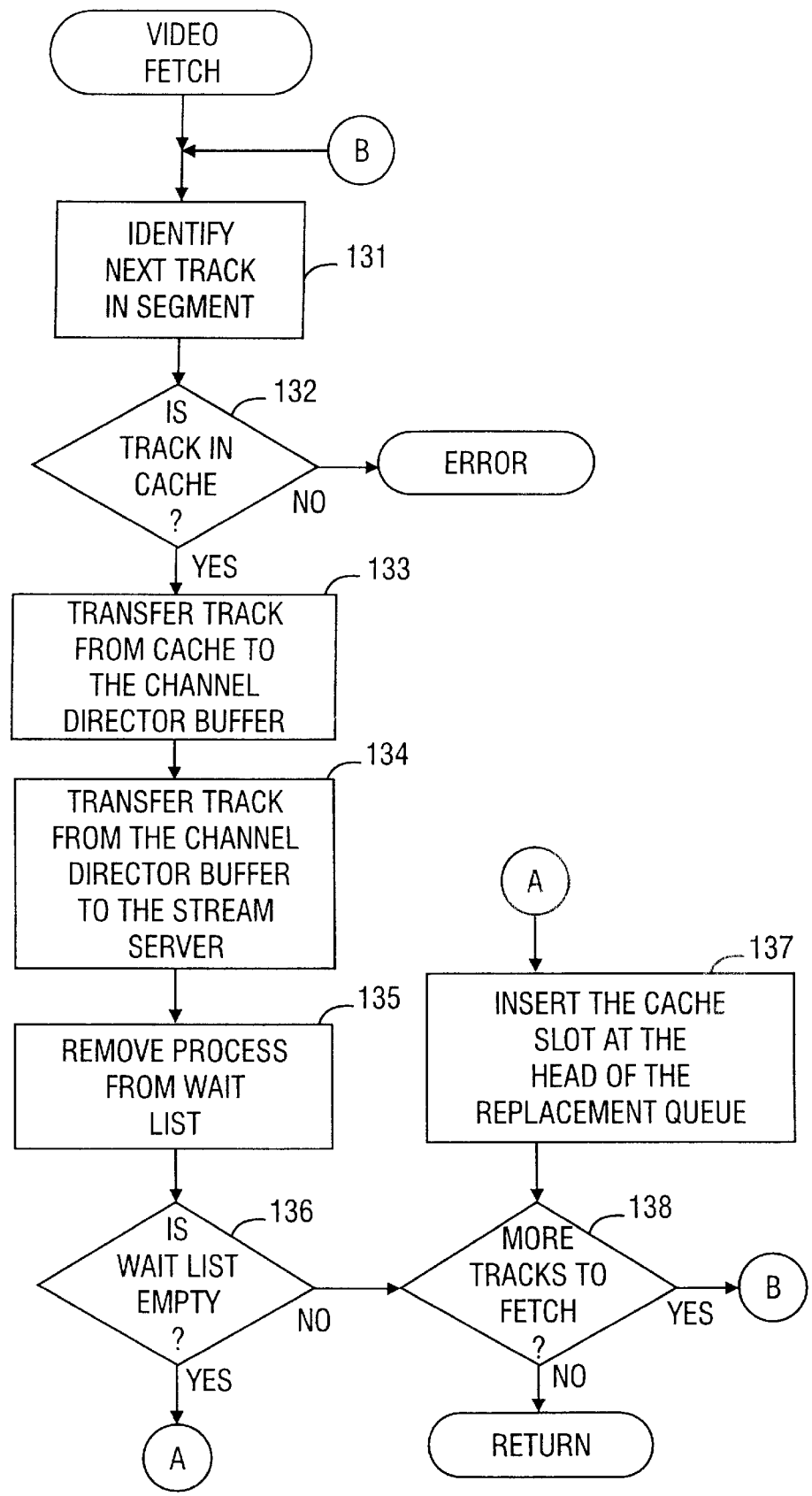
FIG. 12 is a flowchart of a video fetch procedure of the integrated cached disk array in the video file server of FIG. 1.

Turning now to FIG. 12, there is shown a flowchart of a video fetch routine executed by a channel director (43 in FIG. 3) of the ICDA in response to a video fetch command from a stream server. In a first step 131, the channel director identifies the next track in the video segment to be fetched. Then in step 132, the channel director accesses the directory in the ICDA cache memory (41 in FIG. 3) to determine whether data of the track is in the cache and to determine the cache slot containing the data of the track. If the track is not in the cache, then presumably an error has occurred, because each video fetch command specifying a video segment should have been preceded by a video prefetch command specifying the same video segment, and the video prefetch command should have been executed prior to receipt of the video fetch command. Otherwise, in step 133, the data of the track are transferred from the cache slot to a channel director buffer. Next, in step 134, the data are transferred from the channel director buffer to the stream server having issued the fetch command, and in step 135, the process of the stream server having issued the fetch command is removed from the wait list for the cache slot.

In step 136, execution branches depending on whether the wait list is empty. If so, then in step 137, the cache slot is inserted at the head of the replacement queue, so that the cache slot can be used for receiving data staged from another track. After step 137, or when the wait list is not empty, execution continues to step 138. In step 138, execution loops back to step 131 if there are any more tracks in the segment to be fetched. If not, the video fetch routine is done, and execution returns.

If data prefetched from the disk array (47 in FIG. 3) is to be used only by a single network client, then it is desirable to minimize the amount of memory space allocated in the ICDA cache 41 and in the stream server buffer 91 for storing the data. This is done by scheduling the fetch operation no more in advance of the delivery of the data to the network client than is necessary to guarantee that the fetched data will be available in the stream server buffer 91 at the scheduled time for delivery of the data to the network client, and scheduling the prefetch operation no more in advance of the delivery of the data from the ICDA cache 41 than is necessary to guarantee that prefetched data will be available in the ICDA cache when the fetch operation attempts to fetch the data from the ICDA cache.

If data prefetched from the disk array (47 in FIG. 3) will be used by multiple network clients, then it may be desirable to allocate more than the minimum amount of memory in the ICDA cache or stream server buffer for storing the data. For example, the amount of memory to allocate for a movie-on-demand request could be an increasing function of the popularity of the movie.

Figure 13:
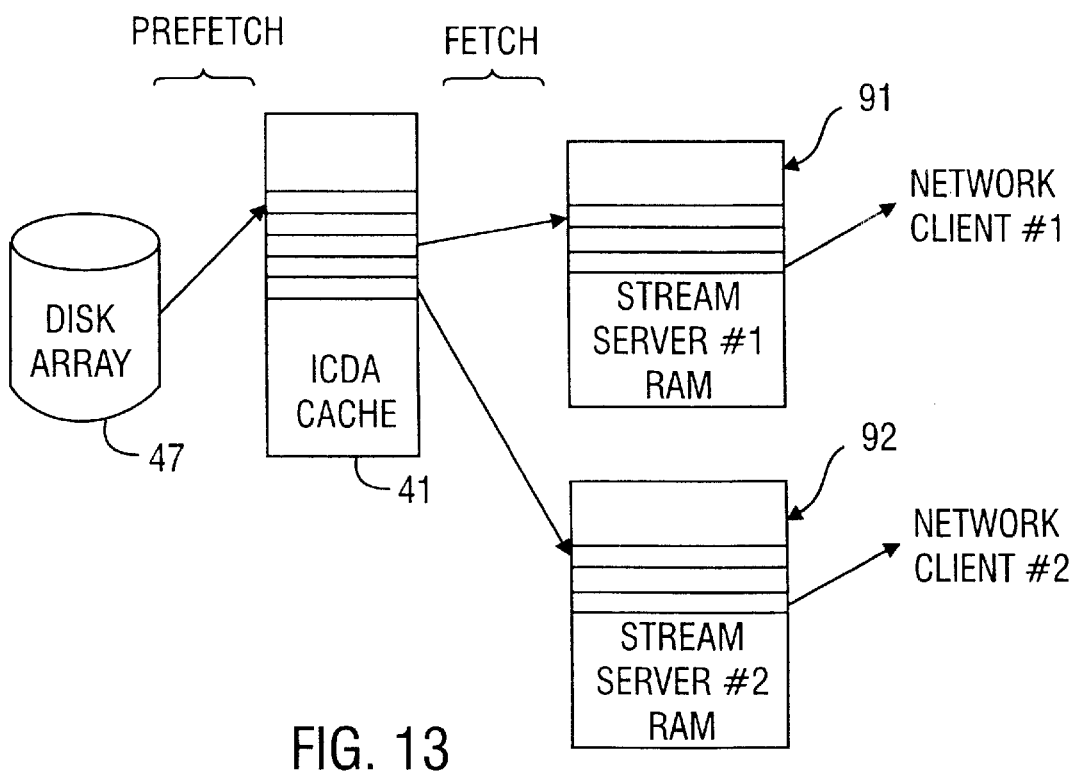
FIG. 13 is a schematic diagram similar to FIG. 9 but showing how a second stream server in the video file server can access data having been prefetched from the disk array for a first stream server of the video file server.

FIG. 13 shows a situation where data prefetched from the disk array 47 and stored in the ICDA cache 41 is used by more than one network client. In this situation, the same data previously fetched for the first network client is fetched from the ICDA cache 41 and transferred to a buffer 92 in RAM of a second one of the stream servers (21 in FIG. 2) and transmitted to a second network client. The loading on the disk array 47 is reduced because data are not prefetched from the disk array 47 separately and independently for each video stream. Instead, the data prefetched from the disk array 47 and stored in the ICDA cache are shared between the two video streams through the two stream server buffers 91, 92 to the two network clients. This is a consequence of the fact that in the video prefetch routine of FIG. 11, if the data are already in the cache, then the data need not be staged from the disk array.

In the situation of FIG. 13, it may be desirable to schedule the prefetch operation further in advance of the delivery of the data from the ICDA cache 41 than is necessary to guarantee that prefetched data will be available in the ICDA cache when the fetch operation attempts to fetch the data from the ICDA cache. It may be desirable to perform such advanced scheduling if the advanced scheduling would reduce the load on the disk array. The load on the disk array would be reduced if at the time of the advanced prefetch for the second network client, the data would reside in the ICDA cache from a prefetch for a first network client. However, by scheduling prefetch far in advance, more cache memory resources would be allocated to servicing the second network client.

In general the desirability of advanced prefetch scheduling is function of the loading on the disk array 47, the loading or free memory capacity of the ICDA cache 41, the occurrence or probability of multiple fetch operations being needed to access the same movie, and the relative position or time difference of the different fetch operations on the same movie. In particular, advanced prefetching will not help unless there will be more than one prefetch operation on the same movie. The relative position or time difference between two prefetch operations on the same stream determines the amount of cache memory needed to eliminate additional disk accesses to support an additional one of the streams. Therefore, if the video file server would receive a request for supporting a new stream on a movie, it could decide whether or not to perform advanced prefetching, and to determine how far in advance to prefetch, in dependence on whether the video file server is already providing another network client with a video stream from the same movie, and the relative position or time difference in the movie between the newly requested stream and the closest existing stream. This time difference would set the ICDA cache memory requirements to support the new stream without requiring additional disk accesses. If the cache memory is available and it is less costly overall in system resources to support the new stream with cache memory instead of disk accesses, then advanced prefetching by an amount related to the time difference should be performed.

Figure 14:
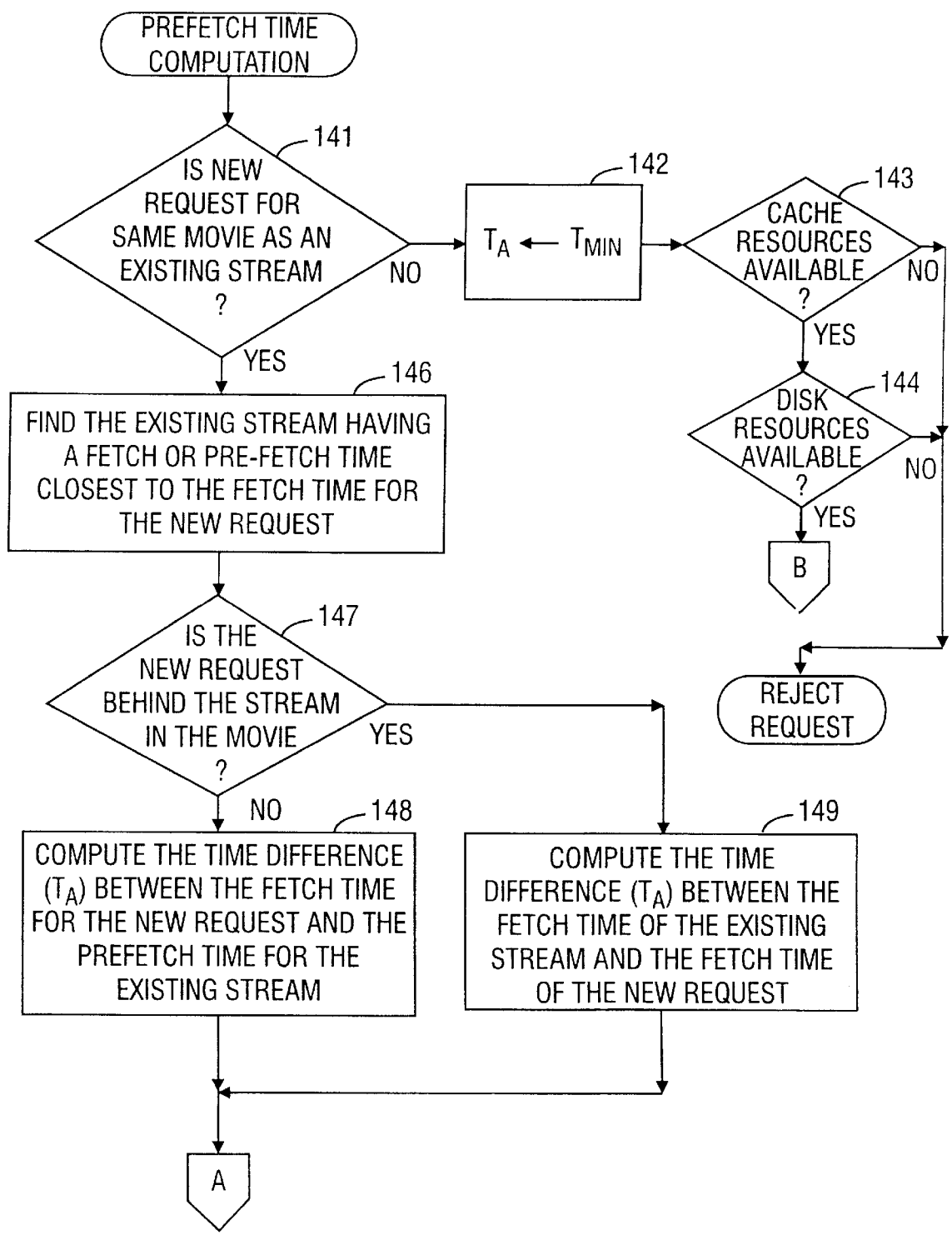
FIG. 14 is a first part of a flowchart of a subroutine for determining whether sufficient cache or disk resources are presently available in the integrated cache disk array for supporting a requested video stream, and if so, determining whether more than a minimum amount of cache memory should be allocated to support the requested video stream.

Turning now to FIG. 14, there is shown a first portion of a flowchart of a routine for computing the prefetch advance time ($T_A$) for supporting a video stream of a new request for an "on demand" movie. Such a routine could be part of the admission policy of the kernel (63 in FIG. 5) of the video server manager. In a first step 141, execution branches depending on whether the new request is for the same movie as an existing stream.

If the new request is not for the same movie as an existing stream, then there is no need for advanced prefetching. In step 142, the prefetch advance time ($T_A$) is set to the minimum time $T_{MIN}$. Then in step 143, the kernel checks whether the minimum cache resources are available to support a new stream. If not, then the new request is rejected. Otherwise, in step 144, the kernel checks whether disk resources are available to support a new stream. If not, then the new request is rejected. Otherwise, execution continues in step 145 in FIG. 15. In step 145, the prefetch advance of the new request is set to $T_A$, and the new request is accepted.

If the new request is for the same movie as an existing stream, then execution continues in FIG. 14 from step 141 to step 146. In step 146, the kernel finds the existing stream having a fetch or pre-fetch time closest in the movie to the fetch time for the new request. In step 147, execution branches depending on whether or not the new request is behind this stream in the movie. If the new request is not behind this existing stream, then in step 148 the kernel computes the time difference ($T_A$) between the fetch time for the new request and the prefetch time for the existing stream. If the new request is behind this existing stream, then in step 149 the kernel computes the time difference ($T_A$) between the fetch time of the existing stream and the fetch time of the new request. After step 148 or 149, execution continues in step 150 of FIG. 15.

Figure 15:
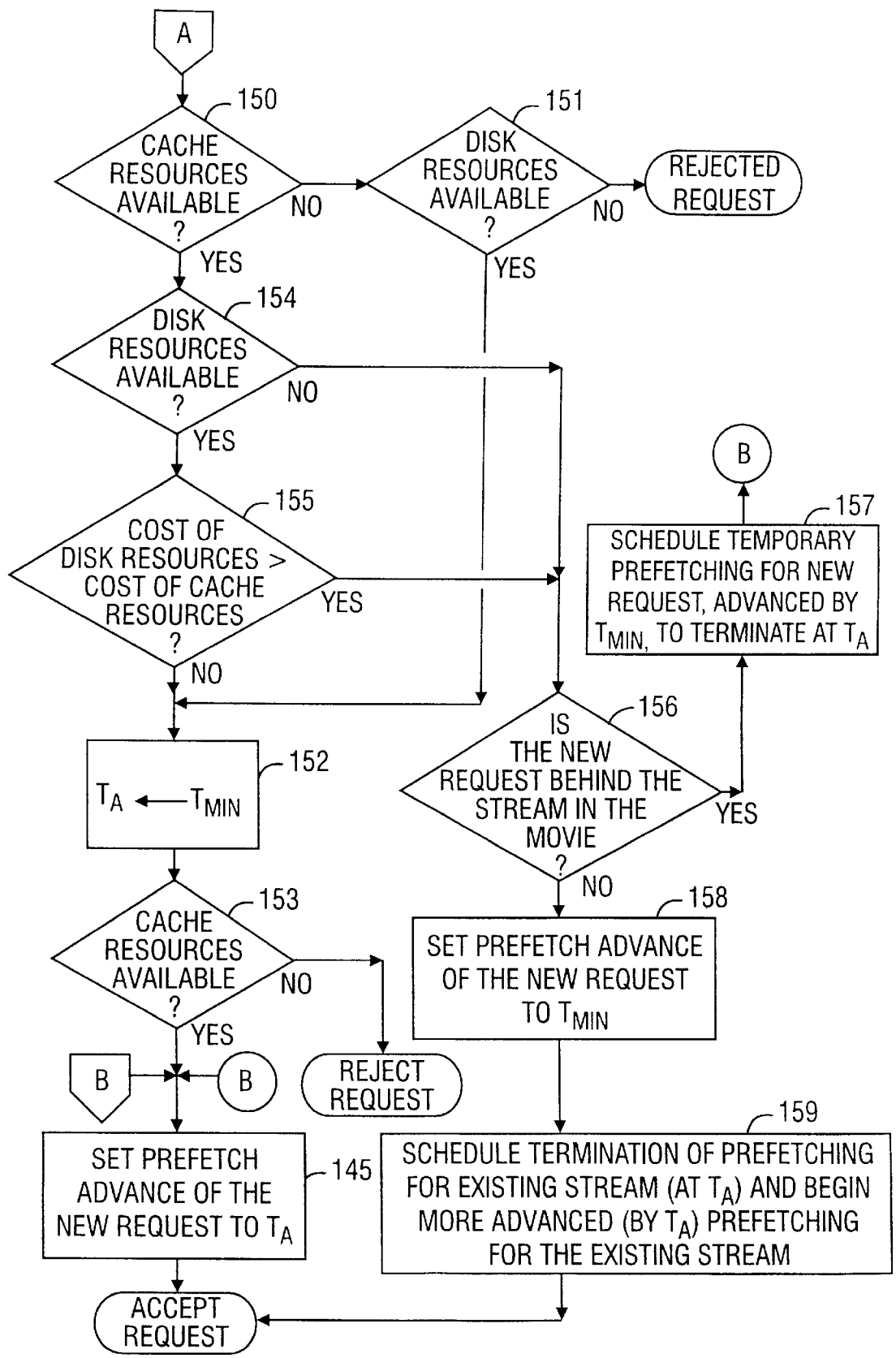
FIG. 15 is a second part of the flowchart begun in FIG. 14.

In step 150 of FIG. 15, the kernel checks whether cache resources are available to support the caching of the movie for the computed time difference ($T_A$). If not, then in step 151 the kernel checks whether disk resources are available to support a new stream. If not, then the request is rejected. If disk resources are available, then execution continues from step 151 to step 152. In step 152, the time difference ($T_A$) is set to the minimum value ($T_{MIN}$). Then in step 153, the kernel checks whether cache resources are available to support the caching of the movie for this minimum time. If not, then the new request is rejected. Otherwise, execution continues to step 145, where the prefetch advance of the new request is set to $T_A$, and the request is accepted.

If in step 150, there are sufficient cache resources available, then execution continues to step 154, where execution branches depending on whether or not disk resources are available to support the new stream. If disk resources are available, then execution continues from step 154 to step 155, where the relative cost of the disk resources for supporting the requested video stream without advanced prefetching is compared to the relative cost of the cache resources for supporting the requested stream with advanced prefetching. For example, the relative cost of the disk resources for supporting the requested video stream without advanced prefetching could be expressed as the percentage of the required disk resources out of presently unused amount of disk resources, and the relative cost of the cache resources for supporting the requested stream with advanced prefetching could be expressed as a percentage of the required cache resources out of the presently unused amount of cache resources. If the relative cost of disk resources does not exceed the relative cost of cache resources, then execution continues from step 155 to step 152. Otherwise, execution branches from step 155 to step 156. Execution also branches to step 156 from step 154 when disk resources are not available to support the new request.

In step 156 execution branches to step 157 if the new request is behind the existing stream in the movie. In this case, in step 157, there is scheduled temporary prefetching for the new request, advanced by $T_{MIN}$, to terminate at a time $T_A$ in the future. This temporary prefetching is scheduled to support the new stream until the time that the new stream caches up to the data having been staged into the ICDA cache for the existing stream. After step 157, execution continues to step 145, where the prefetch advance of the new request is set to $T_A$, and the new request is accepted.

When the new request is ahead of the existing stream in the movie, execution continues from step 156 to step 158, where the prefetch advance of the new request is set to the minimum value $T_{MIN}$. Then in step 159, the existing prefetching for the existing stream is scheduled to terminate in the future at a time of $T_A$ from the present time, and more advanced prefetching for the existing stream (advanced by an additional time of $T_A$) is begun for the existing stream. In this fashion, the new request is accepted.

V. Staggered Stream Support for Video On Demand

The method of sharing prefetched data in the ICDA cache to support more than one video stream as illustrated in FIG. 13 can be further adapted to permit sharing of fetched data in the RAM of a stream server to support more than one video stream from the RAM of the stream server. For video "on demand" service for popular movies, however, it is advantageous to initially allocate large amounts of random access memory of the stream servers to the popular movies, in order to reduce loading on the ICDA cache and disk array. Such allocation of the server RAM to the popular movies ensures that each popular movie needs a minimum amount of ICDA cache and disk array resources.

Figure 16:
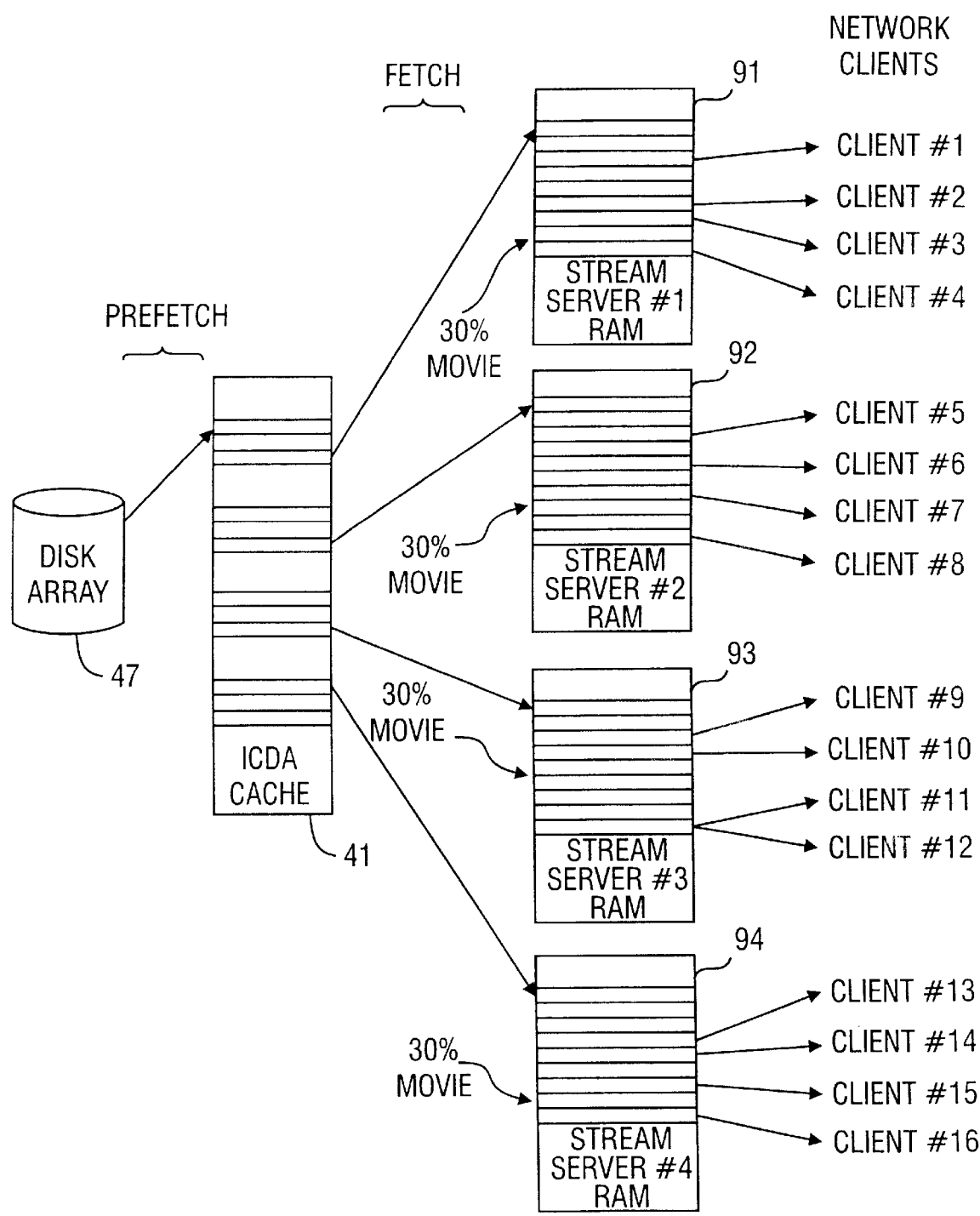
FIG. 16 is a schematic diagram showing "movie-on-demand" service to numerous network clients simultaneously viewing different portions of a movie.

Turning now to FIG. 16, there is shown a schematic diagram illustrating the preferred method of allocating server RAM to a popular movie. In the example in FIG. 16, a block of data for a third of a movie is stored in the RAM of each of four stream servers 91, 92, 93, and 94. In this example, there is a significant amount of overlap between the video data stored in the RAM of the four stream servers in order to simplify scheduling.

Preferably the block of data in the RAM of each of the four stream servers 91, 92, 93 and 94 is a sliding "window" into the movie. New data are added to each window, and old data are removed from each window, at the rate at which data are delivered to the network clients viewing the movie. The block of data providing such a sliding window, for example, is maintained as a simple circular queue. In this fashion, there is no need to re-allocate the network clients to different stream server PCs while a client is viewing a movie in an uninterrupted fashion. However, if a client would request a stop, fast-forward, or fast-reverse operation, it may be necessary to re-allocate a network client to a different stream server PC. In these cases, however, some delay would be acceptable before the client could resume the viewing of the movie. If a stop, fast-forward or fast-reverse operation takes the client's viewing out of the window, then the client's continued viewing of the movie can be treated similar to a new request.

The minimum number of stream server PCs required for supporting each movie according to the method of FIG. 16 is determined as follows. First, each movie needs a certain amount of RAM memory for storing the entire movie, plus a certain minimum amount of window overlap. The amount of RAM memory for storing a movie depends on the length of the movie (such as 90 minutes to 120 minutes) and the bit-rate (megabits per second) at which the encoded movie has been delivered; this rate is typically a function of the method by which the video data are encoded (such as MPEG I or MPEG II).

Second, each stream server PC can be configured with a maximum amount of RAM available as a buffer memory. This maximum amount of memory may limit the size of the window on a single stream server PC. The number of stream server PCs required for storing an entire movie in RAM is computed by dividing the total amount of RAM buffer memory needed for an entire movie (plus required overlap) by the amount of maximum RAM buffer memory of a single stream server PC, and rounding up to a whole number.

Third, each stream server PC can service only a limited number of video streams to the network clients. Given a certain maximum number of anticipated video streams, the minimum number of stream server PCs required for servicing this given number video streams is computed by dividing this given number by the number of video streams that can be serviced by each stream server PC, and rounding up to a whole number.

Finally, the minimum number of stream server PCs required in the system to support a single movie is the greater of the minimum number required to provide the needed buffer memory and the minimum number required to support the maximum number of anticipated video streams. The window size can then be computed by dividing the size of the movie in bytes (plus the required overlap) by the number of stream server PCs in the system.

Figure 17:
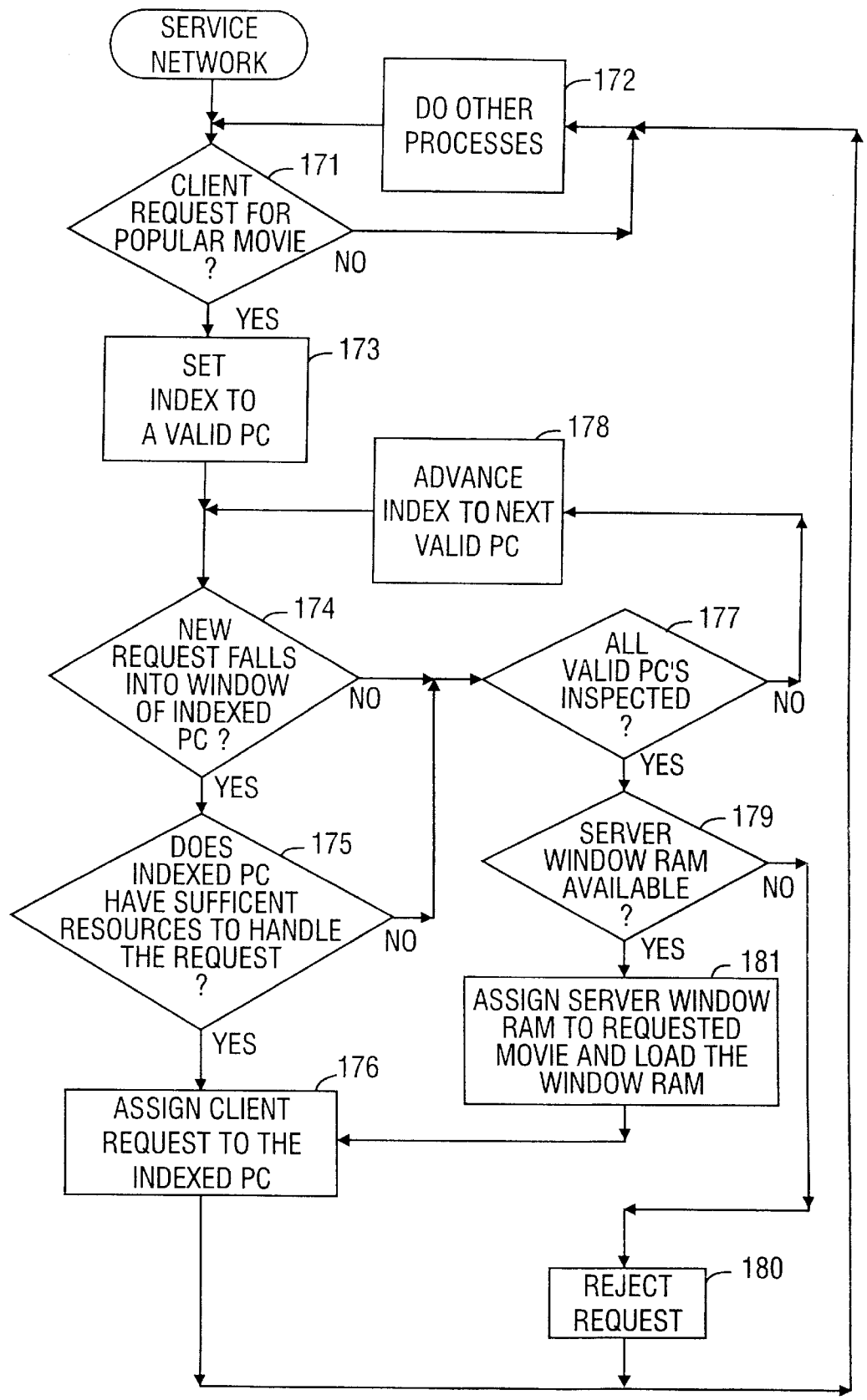
FIG. 17 is a flowchart of a routine for servicing requests from network clients for "movie-on-demand" service in accordance with the schematic diagram in FIG. 16.

Turning now to FIG. 17, there is shown a flowchart of a procedure used in the admission control program for servicing client requests from the network and implementing an admission policy for client requests for a popular movie. In a first step 171, the admission control program checks whether the client request is for something other than a popular movie that has been fetched from the ICDA and loaded into stream server RAM as described above with reference to FIG. 16. If not, execution branches to step 172 to do other processes to service the client request. For example, if the request is for an unpopular movie that is stored in the disk array 47, then the request could be serviced as described above with reference to FIGS. 9 and 13. If the client request is for a popular movie, then execution continues from step 171 to step 173.

In step 173, the admission control program sets an index to point to a first valid or operable one of the stream server PCs. Then in step 174, the admission control program checks whether the desired starting time or position in the movie of the new request falls in the RAM window of the requested movie in the indexed stream server PC. If so, then in step 175 the admission control program checks whether the indexed stream server PC has sufficient resources to handle the client request. The indexed stream server PC, for example, may not have a free network link that would be needed for satisfying the request. In general, a stream server PC has a total buffer memory capacity limitation and a number of bandwidth limitations. The bandwidth limitations include a network bandwidth limitation, a throughput or buffer bandwidth limitation, and a bus bandwidth limitation for communication with the ICDA 23 and the tape silo 34. The throughput or buffer bandwidth limitation is dependent on the type of bus used in the stream server PC. An advantage of the method used in FIG. 17 is that the throughput is used efficiently. Very little of the throughput is used for maintaining the sliding window in RAM, so that most of the throughput can be used for transmitting data from the sliding window to network clients.

If the indexed stream server PC has sufficient resources to handle the client request, then in step 176 the request is accepted by assigning the request to the indexed stream server PC.

If in step 174 the new request does not fall in a RAM window of the requested movie in the indexed stream server PC, or in step 175 the indexed stream server PC does not have sufficient resources to handle the request, then execution branches to step 177. In step 177, the admission control program checks whether all of the valid or operable stream server PCs have been inspected in the process of searching for a stream server PC than can satisfy the client request. This would occur when the next valid stream server PC is the one that was selected in step 173 and first inspected in step 174. If all of the valid PCs have not been inspected, then execution branches to step 178 to advance the index to the next valid PC, and after step 178, execution continues to step 174 to inspect this next valid PC.

If all of the valid PCs have been inspected, then execution continues from step 177 to step 179. In step 179, the admission control program checks whether there is any unassigned window RAM of the stream servers that could be allocated to open another window for the popular movie. This is done, for example, by indexing the valid stream servers again, searching for unallocated RAM windows. If an unallocated RAM window is not found, then execution branches to step 180 to reject the client request. Otherwise, in step 181, a server window RAM is assigned to the movie, and a task is initiated to load this server window RAM with duplicate movie data fetched from the ICDA. If more than one stream server PC has an unallocated window, then one of these stream servers should be selected in an attempt to balance the loading on all of the stream servers. For example, the stream server having the most resources for servicing additional client requests is selected. Then in step 176, the client request is accepted by assigning it to the indexed stream server PC, which has the server window RAM assigned in step 181.

As described above with reference to FIGS. 16 and 17, a set of RAM windows in the RAM 91, 92, 93, 94 of the stream server PCs (21 in FIG. 2) are allocated and loaded with the data for each popular movie before the client requests for the movie are received, so that when a client request for the movie is received, the client can be immediately supplied with a video stream starting at any desired time or position in the movie. In step 181, a new RAM window is allocated and loaded with data when a new client request cannot be serviced from an existing RAM window because the resources of the stream server PC having the existing RAM window are used up in the servicing of prior client requests. However, for a very popular movie, the time for loading of a new RAM window with data might require some delay in the supplying of video data to new client requests because multiple new client requests might be received when data are being loaded from the ICDA to the new RAM window. Therefore, when the resources of a stream server PC having a RAM window for a very popular movie become used up or nearly used up, it could be desirable to allocate a RAM window in another stream server PC at that time and immediately begin loading data into the newly allocated RAM window in anticipation of additional client requests for the very popular movie.

Figure 18:
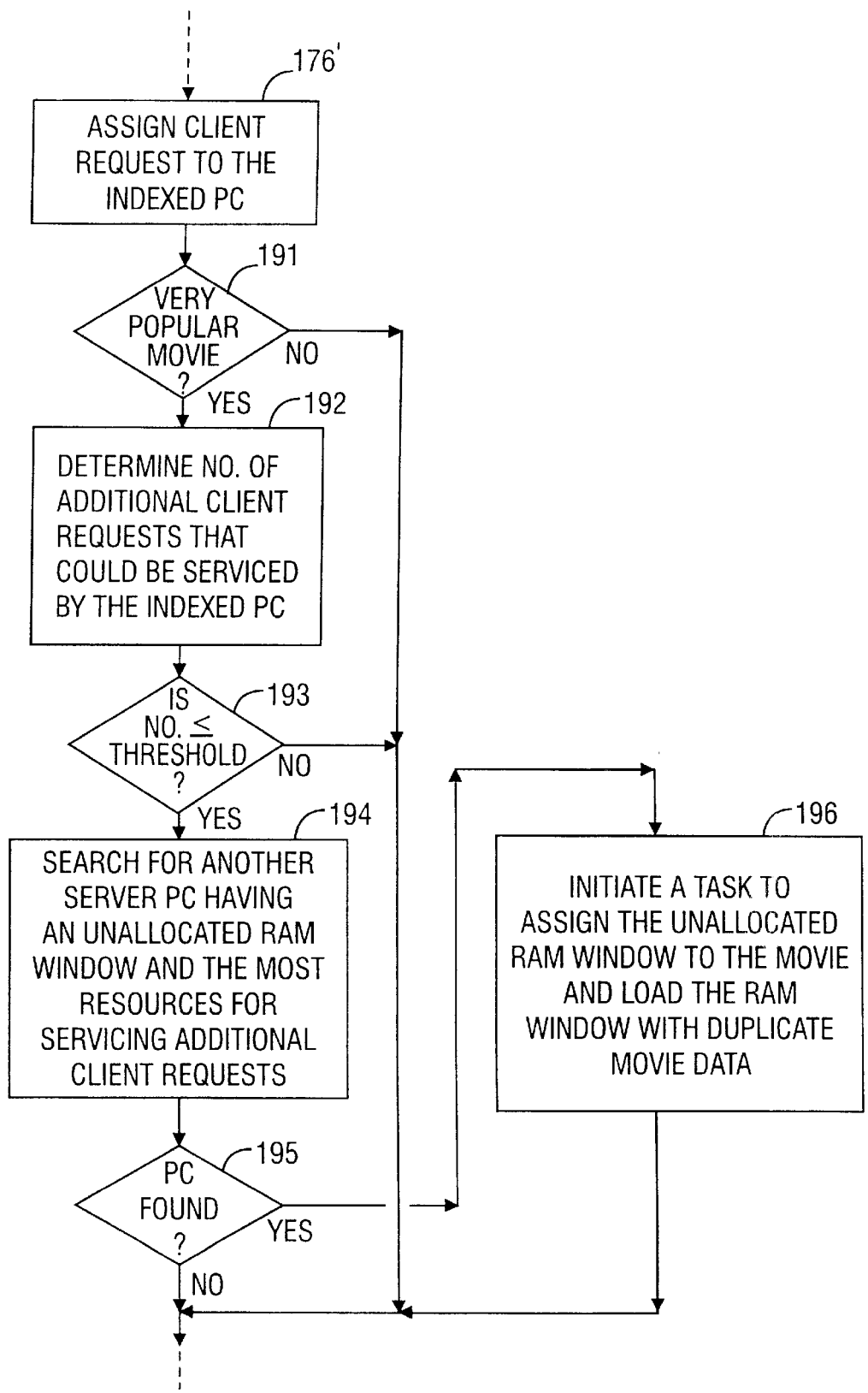
FIG. 18 is a flowchart of steps that could be added to the routine of FIG. 17 to dynamically allocate RAM windows of the stream servers of FIG. 2 in anticipation of client requests for "movie-on-demand" service.

Turning now to FIG. 18, there is shown a flowchart of steps that could be substituted for step 176 of FIG. 17 in order to allocate a RAM window in another stream server PC when the resources of a stream server PC having a RAM window for a very popular movie become used up or nearly used up. The first step 176' in FIG. 18 is similar to step 176 of FIG. 17. After a client request is assigned to the indexed stream server PC in step 176', the admission control program checks in step 191 whether the movie is designated as a very popular movie. For example, a movie should be designated as a very popular movie if more than one client request for the same RAM window of the movie is likely to be received in the time that it takes to load the RAM window.

If the movie is not very popular, then a RAM window of duplicate movie data is not allocated until it is actually needed to service a client request. Otherwise, execution continues from step 191 to step 192. Step 192 determines the number of additional client requests that could be serviced by the indexed stream server PC. In step 193, this number is compared to a threshold, which could be a predetermined constant, such as zero, or which could be a number designated for each movie and related to the popularity of the movie. For example, the number could be approximately the maximum number of requests that are likely to be received for the RAM window of the movie in the time that it takes to load a newly allocated RAM window.

If the number of additional client requests that can be serviced by the indexed stream server PC is not less than or equal to the threshold, then a RAM window of duplicate movie data is not allocated until the indexed stream server PC uses up more of its existing resources for servicing additional client requests. Otherwise, execution continues from step 193 to 194. In step 194, the admission control program searches for another stream server PC having an unallocated RAM window, and the most resources for servicing additional client requests. If such a server PC is found having some resources for servicing additional client requests, as tested in step 195, then execution branches to step 196. In step 196, the admission control program initiates a task to assign the unallocated RAM window to the movie and load the RAM window with duplicate movie data.

VI. On-line Tape Backup

Figure 19:
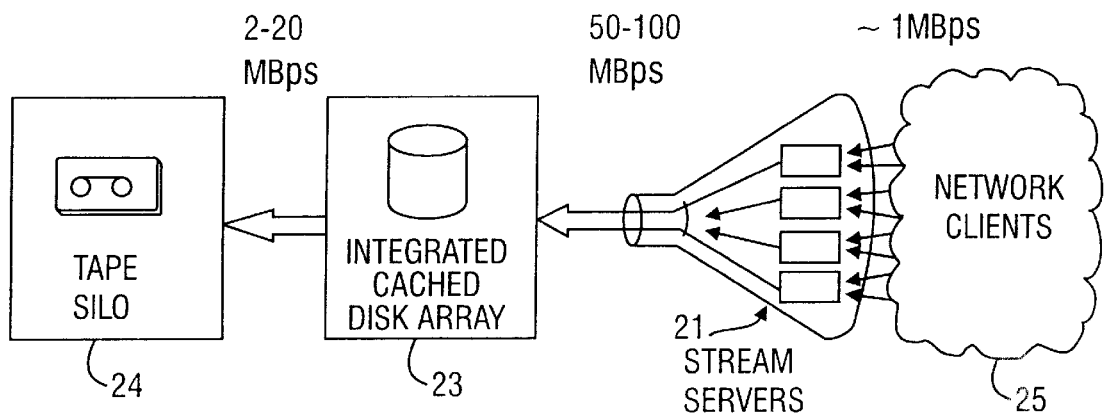
FIG. 19 is a schematic diagram illustrating data flow in the video file server of FIG. 1 during "on-line" tape backup operations.

Turning now to FIG. 19, there is shown a schematic diagram illustrating the flow of data through the file server (20 in FIG. 1) in a "network backup" operation. The stream servers 21 serve to funnel data from clients on the network 25 into the integrated cached disk array 23. The stream servers accept data at a rate on the order of, typically, several megabits per second from each network client (as determined by the existing network connections and remote backup application capabilities). Each stream server sends data to the integrated cached disk array 23 at a rate which is the aggregate of all the streams received by the stream server and can be on the order of about fifty to one hundred megabits per second. The integrated cached disk array in turn sends the backup data to the tape silo 24 at the rate allowed by the capabilities of the tape silo—typically on the order of 2 to 20 megabits per second, much less than the capabilities of the integrated cached disk array. (Disk arrays are typically faster than tape silos, as determined by the ratio of the concurrent number of disk read/write streams to the number of tape read/write drives.) The integrated cached disk array serves as a speed matching buffer and as a means for combining the data or files to be written to a particular tape cartridge in the tape silo 24. Backup data can be streamed, concurrently by all the stream servers, to the ICDA 23 at an aggregate speed on the order of 150 gigabytes per hour. The backup data are then sorted and written to tape at a tape transport speed on the order of 7 gigabytes per hour per device.

It is desirable to use the ICDA 23 as a buffer because backup to tape is relatively slow. The rate at which data are written to a single tape cartridge can be slower than the aggregate rate at which data are transmitted by the network clients. The robotic control of the mounting of a selected tape on a read/write station and the control of the tape transport at the read/write station involves additional delays, which can be effectively avoided by the use of the ICDA 23 as a buffer. The ICDA therefore permits better utilization of the tape read/write stations and reduces tape and tape transport wear. Data can be streamed to tape continuously at tape speed from the ICDA without attempting to match data flow from the stream servers.

Because the ICDA 23 may use a nonvolatile write buffer and well-known RAID techniques of error correction to recover from disk drive failures, the ICDA can acknowledge completion of a backup operation as soon as the data are written to the ICDA. The actual writing to tape could be done as a background process, mainly during off-peak hours, when the stream servers are not heavily loaded by data transfers to and from network clients. The ICDA can provide "instant" restore service for backup files maintained in the ICDA. The ICDA can also provide temporary batch backup, without writing to tape, pending success or failure of transactions by clients that employ transactional semantics or transaction processing.

Figure 20:
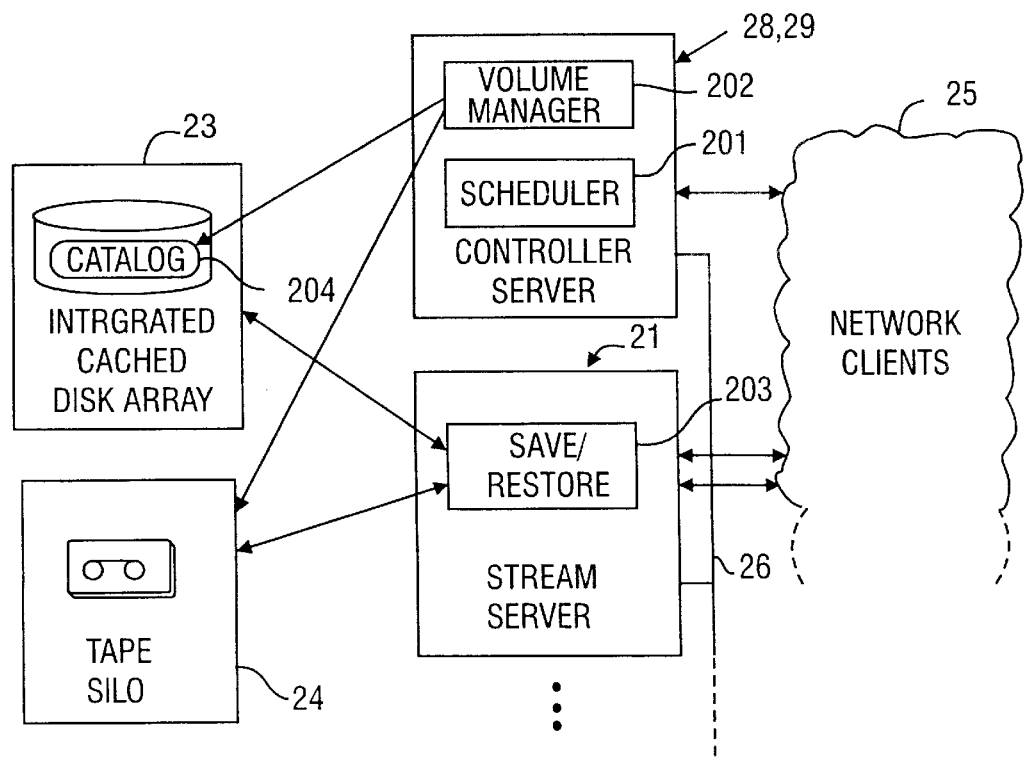
FIG. 20 is a block diagram showing a distribution of software used in the video file server of FIG. 1 for the "on-line" tape backup operations of FIG. 19.

Turning now to FIG. 20, there is shown a block diagram illustrating the distribution of software used in the file server (20 in FIG. 1) for the "on-line" tape backup operations of FIG. 19. The backup software used for this purpose can be designed and written specifically for it, or it can be a modification of an existing backup package, as described below. In particular, an existing implementation of suitable backup software is adapted from the Epoch (trademark) backup software sold by EMC Corporation, 171 South Street, Hopkinton, Mass. 01748. The backup software includes a backup scheduler 201, a volume manager 202, and a save/restore data mover 203. The backup software in the file server (20 in FIG. 1) is adapted from the Epoch (trademark) Hierarchical Storage Management (HSM) software by splitting the save/restore data mover 203 from the backup scheduler 201 and volume manager 202 so that the data mover 203 can run in the environment of a separate computer. The backup scheduler 201 and the volume manager 202 comprise the "control" part of the Epoch (trademark) backup software. The backup scheduler 201 and the volume manager 202 run in the active controller server (28 or 29 in FIG. 2) to provide backup scheduling, migration and catalog management. Alternatively, the backup scheduler 201 and the volume manager 202 could run in a separate external computer (not shown), which could communicate with the stream servers 21 over a network different from the internal Ethernet 26. The save/restore data mover 203 is replicated in each of the stream servers 21, only one of which is shown in FIG. 20. The save/restore data mover 203 is responsive to commands transmitted by the backup scheduler 201 and volume manager 202 over the internal Ethernet link 26. The backup scheduler 201, the volume manager 202, and the save/restore data mover 203 are adapted to communicate via the commands over the Ethernet link 26 instead of the procedure calls that are used in the Epoch (trademark) backup software.

In operation, when the active controller server 28, 29 (or alternatively, the external computer executing the "control" part of the backup software) receives a request from a network client for backup service, the volume manager 202 keeps track of the location of a requested file or data set (whether on disk or on tape). For this purpose, the volume manager accesses a catalog 204 stored in the integrated cached disk array 23. The catalog 204 stores information identifying backed-up files or data sets. For each backed-up file or data set, the catalog also stores information identifying whether the backed-up file is stored on disk in the integrated cached disk array 23 or on tape in the tape silo 24. When the backed-up file or data set is stored on disk in the integrated cached disk array 23, the catalog 204 stores information identifying the tracks containing the file or data set. Each track is identified by a volume, cylinder and head address. When the backed-up file or data set is stored on tape in the tape silo, the catalog 204 stores information identifying the tape cartridge or cartridges containing the file or data set, and the position of the file or data set in each tape cartridge. If a network client requests backup of a new file or data set, the volume manager 202 allocates disk and tape storage to the new file or data set and updates the catalog 204.

The scheduler 201 schedules the movement of data among a network client, the integrated cached disk array 23, and the tape silo 24. For a typical save operation, the scheduler coordinates with the control application being executed by the active one of the controller servers 28, 29 to select one of the stream servers to function as a data mover. The selected stream server moves the backup data from the network client to allocated tracks in the integrated cached disk array. Later, this same stream server or another selected stream server moves the backup data from the integrated cached disk array to the tape silo. When the backup data has been written to allocated disk or tape storage, the catalog 204 is updated to indicate that the data are available to be read during a restore operation.

In a restore operation, a client on the network 25 specifies a file or data set to be restored. The volume manager 202 reads the catalog 204 to find the location of the specified file or data set. If the catalog 204 indicates that the specified file or data set is in the integrated cached disk array 23, then the file or data set is read by a selected one of the stream servers 21 from the integrated cached disk array and transmitted to the network client. Otherwise, if the catalog 204 indicates that the specified file or data set is stored in the tape silo 24, then the file or data set is read by a selected one of the stream servers 21 from the tape silo and transmitted to the client on the network 25.

The integrated cache disk array 23 is used as an intermediate buffer during the restore process. In this case, the selected one of the stream servers 21 reads the backup data from the tape silo 24 and temporarily stores the backup data in the integrated cached disk array 23. Then the same stream server, or another stream server, reads the backup data from the integrated cached disk array 23 and transmits the backup data to the client on the network 25.

What is claimed is:

1. A file server for providing save and restore backup services to clients in a data network, said file server comprising, in combination:
   a cached disk storage subsystem including a random access cache memory and a multiplicity of disk drives;
   a tape silo linked to the cached disk storage subsystem for the transfer of data from the cached disk storage subsystem to the tape silo;
   a plurality of stream server computers linking the cached disk storage subsystem and tape silo to the data network for transfer of data between the cached disk storage subsystem and the data network and between the tape silo and the data network; and
   a controller server for receiving a save or restore backup service request from a client in the data network, for performing volume management and scheduling for the backup service request, and for selecting one of the stream server computers to receive backup data from the client in response to a save backup service request or to transmit the backup data to the client in response to a restore backup service request, and further in response to the save backup service request, for pre-staging the backup data from the client into the cached disk storage subsystem and at a later time staging the backup data into the tape silo by transfer of the backup data from the cached disk storage subsystem to the tape silo.

2. The file server as claimed in claim 1, wherein each stream server computer has a first fast, wide differential (FWD) SCSI link to the integrated cached disk array storage subsystem and a second separate FWD SCSI link to a respective read/write station in the tape silo.

3. The file server as claimed in claim 1, wherein the controller server includes dual, redundant computers which are linked by a local data link to each of the stream server computers.

4. The file server as claimed in claim 3, wherein each of the controller server computers and said stream server computers is a commodity personal computer that is linked to the integrated cached disk array storage subsystem by a fast, wide differential (FWD) SCSI connection.

5. The file server as claimed in claim 1, wherein said controller server includes a processor programmed for executing a volume manager program for the save and restore backup services and a scheduler program for the save and restore backup services, and said stream server computers are programmed for executing a data mover program for the save and restore backup services.

6. The file server as claimed in claim 5, wherein the volume manager program references a catalog in the cached disk storage subsystem, said catalog identifying disk and tape storage locations of the backup data.

7. A file server for providing save and restore backup services to clients in a data network, said file server comprising, in combination:
   a cached disk storage subsystem including a random access cache memory and a multiplicity of disk drives;
   a tape silo;
   a plurality of stream server computers linking the cached disk storage subsystem to the data network for transfer of data between the cached disk storage subsystem and the data network, said stream server computers also linking the tape silo to the cached disk storage subsystem for the transfer of data between the cached disk storage subsystem and the tape silo, wherein each of the stream server computers has a first data link to the cached disk storage subsystem and a second data link to said tape silo; and
   a controller server for receiving a save or restore backup service request from a client in the data network, for performing volume management and scheduling for the backup service request, and for selecting one of the stream server computers to receive backup data from the client in response to a save backup service request or to transmit the backup data to the client in response to a restore backup service request, and further in response to the save backup service request, for pre-staging the backup data from the client into the cached disk storage subsystem and at a later time staging the backup data into the tape silo by transfer of the backup data from the cached disk storage subsystem to the tape silo;
   wherein said controller server includes a processor programmed for executing a volume manager program for the save and restore backup services and a scheduler program for the save and restore backup services, and said stream server computers are programmed for executing a data mover program for the save and restore backup services, and said volume manager program references a catalog in the cached disk storage subsystem, said catalog identifying disk and tape storage locations of the backup data.

8. The file server as claimed in claim 7, wherein said first data link of each stream server computer is a first fast, wide differential (FWD) SCSI link to the integrated cached disk array storage subsystem, and said second data link of each stream server computer is a second separate FWD SCSI link to a respective read/write station in the tape silo.

9. The file server as claimed in claim 7, wherein the controller server includes dual, redundant computers which are linked by a local data link to each of the stream server computers.

10. The file server as claimed in claim 9, wherein each of the controller server computers and said stream server computers is a commodity personal computer that is linked to the integrated cached disk array storage subsystem by a fast, wide differential (FWD) SCSI connection.

11. A method of operating a file server for providing tape backup service to clients in a data network, said file server including a cached disk storage subsystem having a random access cache memory and a multiplicity of disk drives, a tape silo linked to the cached disk storage subsystem for data transfer between the cached disk storage subsystem and the tape silo, and a plurality of stream server computers linking the cached disk storage subsystem to said data network for the transfer of data streams between the cached disk storage subsystem and said data network, said method comprising the steps of:

(a) receiving a backup request from a client in the data network;

(b) streaming backup data from the client to the cached disk storage subsystem through one of said stream server computers; and (c) transferring the backup data from the cached disk storage subsystem to tape storage in the tape silo.

12. The method as claimed in claim 11, further including the step of responding to a restore request from said client by accessing a catalog to determine whether backup data requested by said client reside in said cached disk storage subsystem, and when the requested backup data reside in said cached disk storage subsystem, one of said stream server computers reading the requested backup data from said cached disk storage subsystem and transmitting the requested backup data to said client, and when the requested backup data does not reside in said cached disk storage subsystem, one of said stream server computers reading the requested backup data from the tape storage in the tape silo, and transmitting the requested backup data to said client.

13. The method as claimed in claim 11, wherein said step (c) of transferring the backup data from the cached disk storage subsystem to tape storage in the tape silo is performed by one of said stream server computers reading the backup data from the cached disk storage subsystem and writing the backup data to the tape storage in the tape silo.

14. The method as claimed in claim 11, wherein the cached disk storage subsystem acknowledges completion of a save backup operation as soon as the backup data are written to the cached disk storage subsystem.

15. The method as claimed in claim 11, wherein step (c) of transferring data from the integrated cached disk array storage subsystem to tape storage in the tape silo is performed as a background process during off-peak hours when the stream server computers are not heavily loaded by data transfers to and from the clients in the data network.

16. The method as claimed in claim 11, wherein the integrated cached disk array storage subsystem also provides temporary batch backup, without writing to tape, pending success or failure of transactions by clients that employ transactional processing.

17. The method as claimed in claim 11, which includes maintaining in said integrated cached disk array storage subsystem a catalog identifying disk and tape storage locations of the backup data.

18. A method of operating a file server for providing save and restore backup services to clients in a data network, said file server including a cached disk storage subsystem having a random access cache memory and a multiplicity of disk drives, a tape silo, a plurality of stream server computers linking the cached disk storage subsystem and tape silo to the data network for transfer of data among the cached disk storage subsystem, the tape silo, and the data network, and a controller server for controlling the cached disk storage subsystem, said tape silo, and said stream server computers, said method comprising the steps of:

(a) said controller server receiving a backup request from a client in the data network;

(b) said controller server responding to said backup request by selecting a first one of said stream server computers for streaming backup data from the client to the cached disk storage subsystem; and (c) said controller server scheduling a transfer of the backup data from the cached disk storage subsystem to said tape silo, said transfer of the backup data from the cached disk storage subsystem to said tape silo being performed by a second one of said stream server computers reading the backup data from the cached disk storage subsystem and writing the backup data to tape storage in said tape silo.

19. The method as claimed in claim 18, further including the step of responding to a restore request from said client by accessing a catalog to determine whether backup data requested by said client reside in said cached disk storage subsystem, and when the requested backup data reside in said cached disk storage subsystem, one of said stream server computers reading the requested backup data from said cached disk storage subsystem and transmitting the requested backup data to said client, and when the requested backup data does not reside in said cached disk storage subsystem, one of said stream server computers reading the requested backup data from the tape storage in the tape silo, and transmitting the requested backup data to said client.

20. The method as claimed in claim 18, wherein the cached disk storage subsystem acknowledges completion of a save backup operation as soon as the backup data are written to the cached disk storage subsystem.

21. The method as claimed in claim 18, wherein the transferring of the backup data from the integrated cached disk array storage subsystem to tape storage in the tape silo in said step (c) is performed as a background process during off-peak hours when the stream server computers are not heavily loaded by data transfers to and from the clients in the data network.

22. The method as claimed in claim 18, wherein the integrated cached disk array storage subsystem also provides temporary batch backup, without writing to tape, pending success or failure of transactions by clients that employ transactional processing.

23. The method as claimed in claim 18, which includes maintaining in said integrated cached disk array storage subsystem a catalog identifying disk and tape storage locations of the backup data.

24. A video file server for providing video-on-demand service and save and restore backup services to clients in a data network, said file server comprising, in combination:

a disk storage subsystem;

a tape silo linked to the disk storage subsystem for the transfer of data from the disk storage subsystem to the tape silo;

a plurality of stream server computers linking the disk storage subsystem and tape silo to the data network for transfer of data between the disk storage subsystem and the data network and between the tape silo and the data network; and a controller server for receiving video-on-demand service requests and save or restore backup service requests from clients in the data network, for performing admission control and scheduling for the video-on-demand requests, for performing volume management and scheduling for the backup service requests, and for selecting one of the stream server computers to receive backup data from a client in response to each save backup service request and for selecting one of the stream server computers to transmit the backup data to a client in response to each restore backup service request, and further in response to each save backup service request, for prestaging the backup data into the disk storage subsystem and at later time staging the backup data into the tape silo from the disk storage subsystem.

25. The video file server as claimed in claim 24, wherein said controller server includes a processor programmed for executing a volume manager program for backup services and a scheduler program for backup services, and said stream server computers are programmed for executing a data mover program for backup services.

26. The video file server as claimed in claim 24, wherein the controller server is programmed to schedule the staging of the backup data from the disk storage subsystem to tape storage in the tape silo for performance as a background process during off-peak hours when the stream server computers are not heavily loaded by data transfers to and from the clients in the data network.

27. The method as claimed in claim 24, wherein the disk storage subsystem acknowledges completion of a save backup operation as soon as the backup data are written to the disk storage subsystem.

28. A method of operating a video file server for providing video-on-demand service and save backup services to clients in a data network, said video file server including a disk storage subsystem, a tape silo linked to the disk storage subsystem for data transfer between the disk storage subsystem and the tape silo, and a plurality of stream server computers linking the disk storage subsystem to the data network for the transfer of data streams between the disk storage subsystem and the data network, said method comprising the steps of:
 receiving video-on-demand requests and save backup requests from clients in the network; and
 in response to the video-on-demand requests, streaming video data isochronously from the disk storage subsystem to the network; and
 in response to each save backup request from a client in the data network, streaming backup data from network to the disk storage subsystem through one of said stream server computers, and then transferring the backup data from the disk storage subsystem to the tape silo.

29. The method as claimed in claim 28, wherein the disk storage subsystem acknowledges completion of a save backup operation as soon as the backup data are written to the disk storage subsystem.

30. The method as claimed in claim 28, wherein the backup data are transferred from the disk storage subsystem to tape storage in the tape silo during a background process during off-peak hours when the stream server computers are not heavily loaded by data transfers to and from the clients in the data network.

31. A method of operating a video file server for providing video-on-demand service and save and restore backup services to clients in a data network, said video file server including a disk storage subsystem, a tape silo linked to the disk storage subsystem for data transfer between the disk storage subsystem and the tape silo, and a plurality of stream server computers linking the disk storage subsystem to the data network for the transfer of data streams between the disk storage subsystem and the data network, said method comprising the steps of:
 receiving video-on-demand requests and save and restore backup requests from clients in the network; and
 in response to the video-on-demand requests, streaming video data isochronously from the disk storage subsystem to the network;
 in response to each save backup request from a client in the data network, streaming backup data from the network to the disk storage subsystem through one of said stream server computers, and then transferring the backup data from the disk storage subsystem to the tape silo; and
 in response to each restore backup request from a client in the data network, streaming backup data from the tape silo through one of the stream server computers to the network.

32. The method as claimed in claim 31, wherein the disk storage subsystem acknowledges completion of a save backup operation as soon as the backup data are written to the disk storage subsystem.

33. The method as claimed in claim 31, wherein the backup data are transferred from the disk storage subsystem to tape storage in the tape silo during a background process during off-peak hours when the stream server computers are not heavily loaded by data transfers to and from the clients in the data network.

34. A method of operating a video file server for providing video-on-demand service and save and restore backup services to clients in a data network, said video file server including a cached disk storage subsystem having a random access cache memory and a multiplicity of disk drives, a tape silo linked to the disk storage subsystem for data transfer between the cached disk storage subsystem and the tape silo, and a plurality of stream server computers linking the cached disk storage subsystem to the data network for the transfer of data streams between the disk storage subsystem and the data network, said method comprising the steps of:
 receiving video-on-demand requests and save and restore backup requests from clients in the network; and
 in response to the video-on-demand requests, streaming video data isochronously from the cached disk storage subsystem to the network;
 in response to each save backup request from a client in the data network, streaming backup data from the network to the cached disk storage subsystem through one of said stream server computers, and then transferring the backup data from the cached disk storage subsystem to the tape silo; and
 in response to each restore backup request from a client in the data network, streaming backup data from the tape silo through one of the stream server computers to the network;
 wherein the cached disk storage subsystem acknowledges completion of a save backup operation as soon as the backup data are written to the cached disk storage subsystem; and
 wherein the backup data are transferred from the cached disk storage subsystem to tape storage in the tape silo during a back ground process during off-peak hours when the stream server computers are not heavily loaded by data transfers to and from the clients in the data network.

* * * * *

UNITED STATES PATENT AND TRADEMARK OFFICE
CERTIFICATE OF CORRECTION

PATENT NO.    :    5,829,046

DATED    :    October 27, 1998

INVENTOR(S)    :    Percy Tzelnic and Scott R. Dunham

It is certified that error appears in the above-identified patent and that said Letters Patent is hereby corrected as shown below:

Column 28, line 1:    delete "integrated"
Column 28, line 1:    delete "array"
Column 28, line 57:   delte "integrated"
Column 28, line 58:   delete "array"
Column 29, line 1:    delete "integrated"
Column 29, line 1:    delete "array"
Column 29, line 45:   delete "integrated"
Column 29, line 45:   delete "array"
Column 29, line 51:   delete "integrated"
Column 29, line 51:   delete "array"
Column 29, line 56:   delete "integrated"
Column 29, line 56:   delete "array"
Column 30, line 35:   delete "integrated"
Column 30, line 36:   delete "array"
Column 30, line 43:   delete "integrated"
Column 30, line 43:   delete "array"

UNITED STATES PATENT AND TRADEMARK OFFICE
CERTIFICATE OF CORRECTION

| | |
|---|---|
| PATENT NO. : | 5,829,046 |
| DATED : | October 27, 1998 |
| INVENTOR(S) : | Percy Tzelnic and Scott R. Dunham |

It is certified that error appears in the above-identified patent and that said Letters Patent is hereby corrected as shown below:

Column 30, line 48: delete "integrated"

Column 30, line 48: delete "array"

Signed and Sealed this

Fourth Day of May, 1999

*Attest:*

Q. TODD DICKINSON

*Attesting Officer*  Acting Commissioner of Patents and Trademarks